(12) United States Patent
Ozaki et al.

(10) Patent No.: US 8,941,737 B2
(45) Date of Patent: Jan. 27, 2015

(54) IMAGE GENERATING APPARATUS AND IMAGE DISPLAY SYSTEM

(75) Inventors: Yukisuke Ozaki, Kobe (JP); Yasuhiro Ohno, Kobe (JP); Takayoshi Yamashita, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 357 days.

(21) Appl. No.: 13/322,654

(22) PCT Filed: May 28, 2010

(86) PCT No.: PCT/JP2010/059074
§ 371 (c)(1),
(2), (4) Date: Nov. 28, 2011

(87) PCT Pub. No.: WO2010/137684
PCT Pub. Date: Dec. 2, 2010

(65) Prior Publication Data
US 2012/0069187 A1      Mar. 22, 2012

(30) Foreign Application Priority Data
May 29, 2009   (JP) .................................. 2009-130100

(51) Int. Cl.
*B60R 1/00*   (2006.01)
*G09G 5/14*   (2006.01)

(52) U.S. Cl.
CPC .. *B60R 1/00* (2013.01); *G09G 5/14* (2013.01); *B60R 2300/105* (2013.01);
(Continued)

(58) Field of Classification Search
CPC ................ B60R 1/00; B60R 2300/105; B60R 2300/304; B60R 2300/602; G09G 2380/10
USPC .......................... 348/148, 222.1, 169; 382/103
See application file for complete search history.

(56) References Cited

U.S. PATENT DOCUMENTS 6,911,997 B1 * 6/2005 Okamoto et al. ............. 348/148
7,307,655 B1 * 12/2007 Okamoto et al. .......... 348/222.1

FOREIGN PATENT DOCUMENTS

JP   A-3-99952     4/1991
JP   A-10-258682   9/1998
(Continued)

OTHER PUBLICATIONS

Sep. 18, 2013 Office Action issued in Chinese Patent Application No. 201080023686.6 (with English translation).
(Continued)

*Primary Examiner* — Dave Czekaj
*Assistant Examiner* — Berteau Joisil
(74) *Attorney, Agent, or Firm* — Oliff PLC

(57) ABSTRACT

A technology for intuitively recognizing a positional relation between a vehicle and an object is provided. In an image display system, in a display image provided to a driver, the side region of the vehicle in a direction indicated by a direction instructing device is displayed in large size. Accordingly, the object that may contact with the vehicle is easily found out, so that a minor crash accident can be effectively prevented. Since a synthetic image viewed from a virtual viewpoint directed from a rear position of the vehicle toward the front side of the vehicle is displayed, the side area of the vehicle is displayed in the same visual field direction as the direction of the visual field of the driver. Accordingly, the driver can intuitively recognize the positional relation between the vehicle and the object, without undertaking complicated determination such as conducting coordinate transformation in his/her mind.

11 Claims, 28 Drawing Sheets

(52) U.S. Cl.
CPC .... *B60R 2300/304* (2013.01); *B60R 2300/602* (2013.01); *B60R 2300/806* (2013.01); *B60R 2300/8093* (2013.01); *G09G 2340/12* (2013.01); *G09G 2380/10* (2013.01)
USPC .......................................................... 348/148

(56) References Cited

FOREIGN PATENT DOCUMENTS

| JP | A-2001-114048 | 4/2001 |
|----|---------------|--------|
| JP | A-2002-109697 | 4/2002 |
| JP | A-2002-135765 | 5/2002 |
| JP | A-2005-39547 | 2/2005 |
| JP | A-2005-170286 | 6/2005 |
| JP | A-2005-223524 | 8/2005 |
| JP | A-2006-279511 | 10/2006 |
| JP | A-2009-93485 | 4/2009 |

OTHER PUBLICATIONS

International Search Report issued in International Application No. PCT/JP2010/059074 on Aug. 24, 2010 (with translation).

* cited by examiner

IMAGE GENERATING APPARATUS AND IMAGE DISPLAY SYSTEM

BACKGROUND FIELD

The present invention relates to a technology for displaying an image to be displayed on a display apparatus mounted on a vehicle.

RELATED ART

An image display system of a related art is mounted on a vehicle such as a car, and captures the periphery of the vehicle to generate an image and display the image in a display in the inside of the vehicle. For example, an outside area of a front fender, which is opposite to a driver's seat, can be easily blinded. By using the image display system that displays an image obtained by capturing the outside area of the front fender, the driver can easily recognize clearance between the vehicle body opposite to the driver's seat and an obstacle when the vehicle passes by an oncoming vehicle on a narrow road or in other cases.

There has been suggested a technology for displaying an image showing a broad area of the vehicle periphery, and not a limited area of the vehicle periphery such as the outside area of the front fender, in the inside of the vehicle. For example, Patent Document 1 arranges and displays three images obtained by vehicle mounting cameras, which are provided on a front side and left and right sides of the vehicle, respectively, on one screen.

Patent Document 2 suggests a technology for providing an image showing the periphery of the vehicle viewed from a virtual viewpoint set substantially directly above the vehicle, by using a plurality of captured images obtained from capturing the periphery of the vehicle by means of a plurality of vehicle mounting cameras. Patent Document 2 also suggests a technology for moving a position of a driver's own vehicle in an image in accordance with a direction indicated by a direction indication.

RELATED ART

Patent Documents

Patent Document 1: Japanese Patent Application Publication No. 2001-114048
Patent Document 2: Japanese Patent Application Publication No. Hei 3-99952

DISCLOSURE OF THE INVENTION

Technical Problem to be Solved by the Invention

In the image display system of the related art, a visual field direction of a viewpoint looking an object displayed in an image to be displayed is a direction of an optical axis of the vehicle mounting cameras, or a direction looking down the vehicle from substantially directly above the vehicle. Accordingly, the driver sees the image and recognizes a positional relation between an actual object and the vehicle through a thinking process, i.e., conducting coordinate transformation in his/her mind, based on the position of the object in the image. However, it is difficult to determine the positional relation between the actual object and the vehicle in a moment.

As in Patent Document 1, in case of displaying the front side and the left and right sides of the vehicle on one screen, the image showing the front side of the vehicle and the image showing the sides of the vehicle are different in terms of a visual field direction. Accordingly, the driver may be confused of a direction toward which an object exists, so that the driver cannot determine the positional relation between the object and the vehicle in a moment.

However, when the driver who drives the vehicle finds out an object that may contact with the vehicle, he/she needs to conduct avoidance driving to avoid crash by a momentary decision. However, in the conventional image display system, it is difficult to determine the positional relation between the vehicle and an object around the vehicle in a moment. Accordingly, there is a case where making an exact decision in a moment is difficult. Accordingly, a technology for more intuitively recognizing the positional relation between the vehicle and an object has been demanded.

The present invention has been made in consideration of the circumstances, and its object is to provide a technology for intuitively recognizing a positional relation between a vehicle and an object.

The object of the present invention is accomplished by the configuration set forth below.

(1) An image generating apparatus that generates an image to be displayed on a display apparatus mounted on a vehicle, the image generating apparatus comprising: a synthetic image generating section that generates a synthetic image around the vehicle based on a plurality of images of the periphery of the vehicle took by a plurality of cameras, the synthetic image being viewed from a virtual viewpoint which is disposed behind the vehicle and is directed to the front side of the vehicle; an output section that outputs the generated synthetic image to the display apparatus; and an input section that inputs a direction indication of a driver of the vehicle, wherein the synthetic image generating section: generates a first synthetic image in which left side area of the vehicle is displayed in substantially the same size as right side area of the vehicle when the direction indication is not input by the input section; and generates a second synthetic image in which one side area of the vehicle, which is indicated by the direction indication is displayed larger in size than another side area of the vehicle when the direction indication is input by the input section.

(2) The image generating apparatus as set forth in (1) above, wherein the synthetic image generating section continues to generate the second synthetic image for a predetermined period when the input section stops inputting the direction indication, and wherein the synthetic image generating section starts generating the first synthetic image after the predetermined period when the direction indication is not input during the predetermined period.

(3) The image generating apparatus as set forth in (1) or (2) above, further comprising a display image generating section that generates a display image including a front image took by a camera provided at the front side of the vehicle and the synthetic image generated by the synthetic image generating section, wherein the output section outputs the generated display image to the display apparatus.

(4) The image generating apparatus as set forth in any one of (1) to (3) above, wherein when changing the virtual viewpoint of the synthetic image from a first position to a second position, the synthetic image generating section moves the virtual viewpoint from the first position to the second position in a stepwise manner to generate a plurality of synthetic images for creating an animation in which the virtual viewpoint is moved in a continuous manner.

(5) An image generating apparatus that generates an image to be displayed on a display apparatus mounted on a vehicle, the image generating apparatus comprising: a synthetic image generating section that generates a synthetic image around the vehicle based on a plurality of images of the periphery of the vehicle took by a plurality of cameras, the synthetic image being viewed from a virtual viewpoint which is disposed behind the vehicle and is directed to the front side of the vehicle, and including a right side area and a left side area of the vehicle; a display image generating section that generates a display image including a front image took by a camera provided at the front side of the vehicle and the synthetic image generated by the synthetic image generating section; and an output section that outputs the generated display image to the display apparatus.

(6) An image generating apparatus that generates an image to be displayed on a display apparatus mounted on a vehicle, the image generating apparatus comprising: a synthetic image generating section that generates a synthetic image being viewed from a virtual viewpoint based on a plurality of images of the periphery of the vehicle took by a plurality of cameras; and an output section that outputs the generated synthetic image to the display apparatus, wherein when changing the virtual viewpoint of the synthetic image from a first position to a second position, the synthetic image generating section moves the virtual viewpoint from the first position to the second position in a stepwise manner to generate a plurality of synthetic images for creating an animation in which the virtual viewpoint is moved in a continuous manner.

(7) The image generating apparatus as set forth in (6) above, wherein the synthetic image generating section changes the virtual viewpoint from a reference position.

(8) The image generating apparatus as set forth in (7) above, wherein the reference position is a position corresponding to a viewpoint of a driver of the vehicle.

(9) An image display system to be mounted on a vehicle, the image displaying system comprising: the image generating apparatus as set forth in any one of (1) to (8) above; and a display apparatus that displays an image generated by the image generating apparatus.

Effect of the Invention

The image generating apparatus set forth in (1) to (4) above and the image display system set forth in (9) above widely display a side area in a direction intended by the driver, where there is most likely an object, with which the vehicle may contact when the vehicle moves upon changing a direction or moving toward a roadside. Accordingly, the object that may contact with the vehicle is easily found out, so that a minor crash accident can be effectively prevented. Since a synthetic image viewed from a virtual viewpoint directed from a rear position of the vehicle toward the front side of the vehicle is displayed, the side area of the vehicle is displayed in the same visual field direction as the direction of the visual field of the driver. Accordingly, the driver can intuitively recognize the positional relation between the vehicle and the object, without undertaking complicated determination such as conducting coordinate transformation in his/her mind.

According to the image generating apparatus set forth in (2) above, it is possible to prevent the occasion that seeing a synthetic image displayed on a display apparatus is difficult because a viewpoint of the synthetic image is frequently changed when the direction indication is continuously operated in short time, or in other cases.

According to the image generating apparatus set forth in (3) above, the display apparatus displays the front area and the left and right side areas of the vehicle on the same screen. Accordingly, an area that the driver desires to monitor upon driving can be monitored from the same screen without changing the screen. Since the visual field direction of the front image, the visual field direction of the synthetic image, and the visual field direction of the driver are substantially identical, the driver can intuitively recognize the positional relation of an object displayed on the screen, without undertaking complicated determination such as conducting coordinate transformation in his/her mind. Accordingly, even if much information has been provided, the driver can make an exact decision, so that safety can be assured.

According to the image generating apparatus set forth in (4) above, animation expression of a synthetic image, in which a virtual viewpoint is moved in a continuous manner from a first position to a second position, is created on the display apparatus. As such, compared to the case where the virtual viewpoint is converted from the first position to the second position in a moment, the driver can easily intuitively recognize the position of the virtual viewpoint of the synthetic image after the conversion of the virtual viewpoint.

According to the image generating apparatus set forth in (5) above, since the display apparatus displays the front area and the left and right side areas of the vehicle on the same screen, an area that the driver desires to monitor can be monitored from the same screen without changing the screen. Since the visual field direction of the front image, the visual field direction of the synthetic image, and the visual field direction of the driver are substantially the same, the driver can intuitively recognize the positional relation of the object displayed on the screen, without undertaking complicated determination such as conducting coordinate transformation in his/her mind. Accordingly, even if much information has been provided, the driver can make an exact decision, so that safety can be assured.

According to the image generating apparatus set forth in (6) to (8), animation expression of a synthetic image, in which the virtual viewpoint is moved from the first position to the second position on the display apparatus, is created on the display apparatus. Accordingly, compared to the case where the virtual viewpoint moves from the first position to the second position in a moment, the driver can easily intuitively recognize the position of the virtual viewpoint of the synthetic image after the conversion of the virtual viewpoint.

According to the image generating apparatus set forth in (7), since the virtual viewpoint moves from a reference position, the driver can easily intuitively recognize the position of the virtual viewpoint of the synthetic image after the conversion of the virtual viewpoint with respect to the relation with the reference position.

According to the image generating apparatus set forth in (8), since the virtual viewpoint moves from a reference position corresponding to the viewpoint of the driver, the driver can more easily intuitively recognize the position of the virtual viewpoint of the synthetic image after the conversion of the virtual viewpoint.

BRIEF DESCRIPTIONS OF THE DRAWINGS

BEST MODE TO CARRY OUT THE INVENTION

Hereinafter, an embodiment of the present invention will be described with reference to the drawings.

1. Configuration

Figure 1:
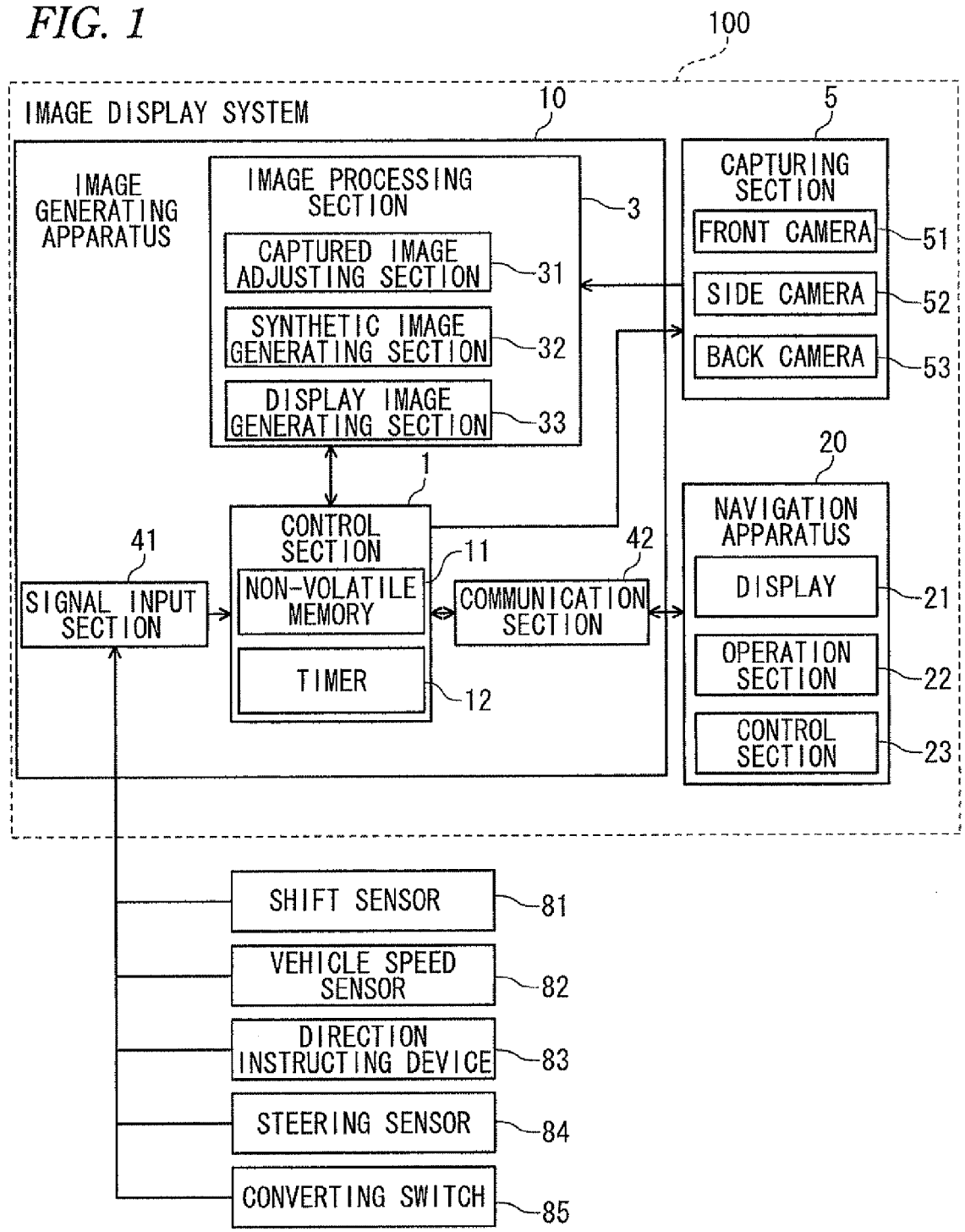
FIG. 1 is a block view of an image display system.

FIG. 1 is a block view of an image display system 100 according to an embodiment of the present invention. The image display system 100 is mounted on a vehicle (a ear in the present embodiment) and has a function of capturing the periphery of the vehicle to generate an image and display the image in the inside of the vehicle. A user of the image display system 100 who is a driver of the vehicle can easily monitor the periphery of the vehicle by using the image display system 100.

As illustrated in FIG. 1, the image display system 100 includes a capturing section 5 that captures the periphery of the vehicle, an image generating apparatus 10 that generates a display image showing the periphery of the vehicle, and a navigation apparatus 20 that provides various information to the driver of the vehicle. The image generating apparatus 10 is configured by ECU (Electronic Control Unit) having an image generating function and disposed at a predetermined position of the vehicle.

The navigation apparatus 20 carries out navigation guide to the driver. The navigation apparatus 20 includes a display 21 such as a liquid crystal that has a touch panel function, an operating section 22 that is operated by the driver, and a control section 23 that controls the apparatus as a whole. The navigation apparatus 20 is provided on an instrument panel or others of the vehicle so that the screen of the display 21 can be seen from the driver. Various instructions from the driver are received by the operating section 22 and the display 21 as a touch panel. The control section 23 is configured by a computer having CPU, RAM, ROM, and others. Various functions including the navigation function are accomplished in the manner that the CPU carries out calculation processing in accordance with predetermined programs.

The navigation apparatus 20 is communicably connected to the image generating apparatus 10. The navigation apparatus 20 can transmit and receive various control signals with the image generating apparatus 10 or receive a display image generated in the image generating apparatus 10. The display 21 usually displays a map image for navigation guide. However, the display 21 displays a display image generated in the image generating apparatus 10 and showing the vehicle periphery, in response to predetermined operation by the driver or a signal or others from the image generating apparatus 10. Accordingly, the navigation apparatus 20 also functions as a display apparatus that receives a display image generated in the image generating apparatus 10 and displays the image.

The capturing section 5 is electrically connected to the image generating apparatus 10 and operated based on a signal from the image generating apparatus 10. The capturing section 5 includes vehicle monitoring cameras, i.e., a front camera 51, side cameras 52, and a back camera 53. The vehicle mounting cameras 51, 52, and 53 include lenses and imaging elements and electronically acquire images.

Figure 2:
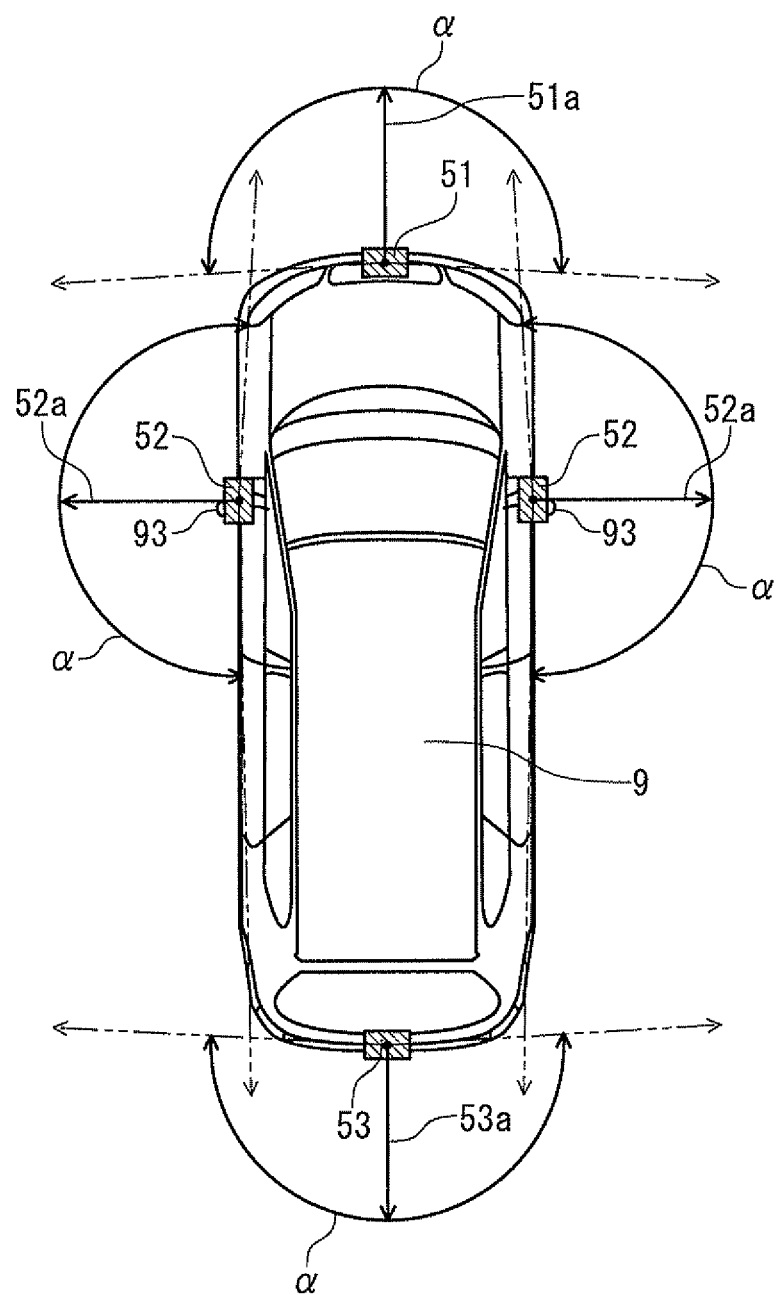
FIG. 2 is a view showing positions where vehicle mounting cameras are disposed on a vehicle.

FIG. 2 is a view showing positions where the vehicle mounting cameras 51, 52, and 53 are disposed on the vehicle 9. As illustrated in FIG. 2, the front camera 51 is provided near a position where a number plate is provided at the front end of the vehicle 9. An optical axis 51a of the front camera 51 is toward the straight direction of the vehicle 9. The side cameras 52 are provided on left and right door mirrors 93, respectively. Optical axes 52a of the side cameras 52 are toward an outside direction of the vehicle 9 to be orthogonal to the straight direction. The back camera 53 is provided near a position where a number plate is provided at the rear end of the vehicle 9. An optical axis 53a of the back camera 53 is toward a reverse direction of the straight direction of the vehicle 9. The front camera 51 or the back camera 53 is preferably provided in substantially a center of the left and the right, but may be positioned somewhat out of the center of the left and the right toward the left or right direction.

For the lenses of the vehicle mounting cameras 51, 52, and 53, fish-eye lenses or others are adopted. The vehicle mounting cameras 51, 52, and 53 have at least 180° of an angle of view α. Accordingly, if the four vehicle mounting cameras 51, 52, and 53 are used, it is possible to capture the entire circumference of the vehicle 9.

Returning to FIG. 1, the image generating apparatus 10 includes a control section 1 that controls the apparatus as a whole, an image processing section 3 that processes a captured image acquired from the capturing section 5 and generates a display image, and a communication section 42 that communicates with the navigation apparatus 20. Various instructions received from the driver through the operating section 22 or the display 21 of the navigation apparatus 20 are received by the communication section 42 as control signals and input into the control section 1. Accordingly, the image generating apparatus 10 can implement operation in response to the driver's operation to the navigation apparatus 20.

The image processing section 3 is configured by a hardware circuit capable of processing various images and includes a captured image adjusting section 31, a synthetic image generating section 32, and a display image generating section 33 as main functions. The captured image adjusting section 31 adjusts a captured image acquired from the capturing section 5 to be a display image. The captured image adjusting section 31 implements adjustment of image quality of a captured image such as brightness or contrast, distortion amendment of an image so that the image is naturally displayed, or others. The synthetic image generating section 32 generates a synthetic image viewed from a certain virtual viewpoint in the vicinity of the vehicle 9, based on a plurality of captured images that have been acquired from the plurality of vehicle mounting cameras 51, 52, and 53 of the capturing section 5. How the synthetic image generating section 32 generates a synthetic image viewed from a virtual viewpoint will be described hereafter.

The display image generating section 33 generates a display image to be provided to the driver, by using one or combination of a plurality of images from the captured images that have been adjusted in the captured image adjusting section 31 and the synthetic images that have been generated by the synthetic image generating section 32. The generated display image is output to the navigation apparatus 20 by the communication section 42, and displayed on the display 21 of the navigation apparatus 20.

The control section 1 is configured by a computer having CPU, RAM, ROM, and others. Various control functions are accomplished in the manner that the CPU carries out calculation processing in accordance with predetermined programs. The functions of the control section 1 that are accomplished as described above include a function of controlling image processing that is implemented by the image processing section 3, i.e., a function of controlling contents of a display image. Various parameters needed to generate synthetic images in the synthetic image generating section 32 are instructed by the functions of the control section 1. The control section 1 also includes a non-volatile memory 11 configured by a flash memory or others, and a timer 12 having a measuring function.

The image generating apparatus 10 also includes a signal input section 41 that inputs signals from various apparatuses provided in the vehicle 9. Signals from the outside of the vehicle 9 are input to the control section 1, through the signal input section 41. Specifically, signals presenting various information are input from a shift sensor 81, a vehicle speed sensor 82, a direction instructing device 83, a steering sensor 84, a converting switch 85, and others to the control section 1. Meanwhile, the image display system 100 may be configured to include parts or all of the shift sensor 81, the vehicle speed sensor 82, the direction instructing device 83, the steering sensor 84, and the converting switch 85.

From the shift sensor 81, a position of operation of a shift lever in the transmission of the vehicle 9, i.e., a shift position such as "P (parking)," "D (driving)," "N (neutral)," or "R (reversing)" is input. From the vehicle speed sensor 82, a driving speed (km/h) of the vehicle 9 at that time is input.

From the direction instructing device 83, a direction instruction based on operation of a winker switch, i.e., a turn signal presenting a direction instruction intended by the driver of the vehicle 9 is input. When the winker switch is operated, a turn signal is generated. The turn signal presents the operated direction (left or right direction). When the winker switch is in a neutral position, the turn signal is off.

From the steering sensor 84, a direction of rotation of a steering wheel by the driver and an angle of the rotation are input. The converting switch 85 is a switch that receives an instruction to convert an aspect of a display image from the driver. From the converting switch 85, a signal presenting an instruction of the driver is input to the control section 1.

2. Image Conversion Processing

Figure 3:
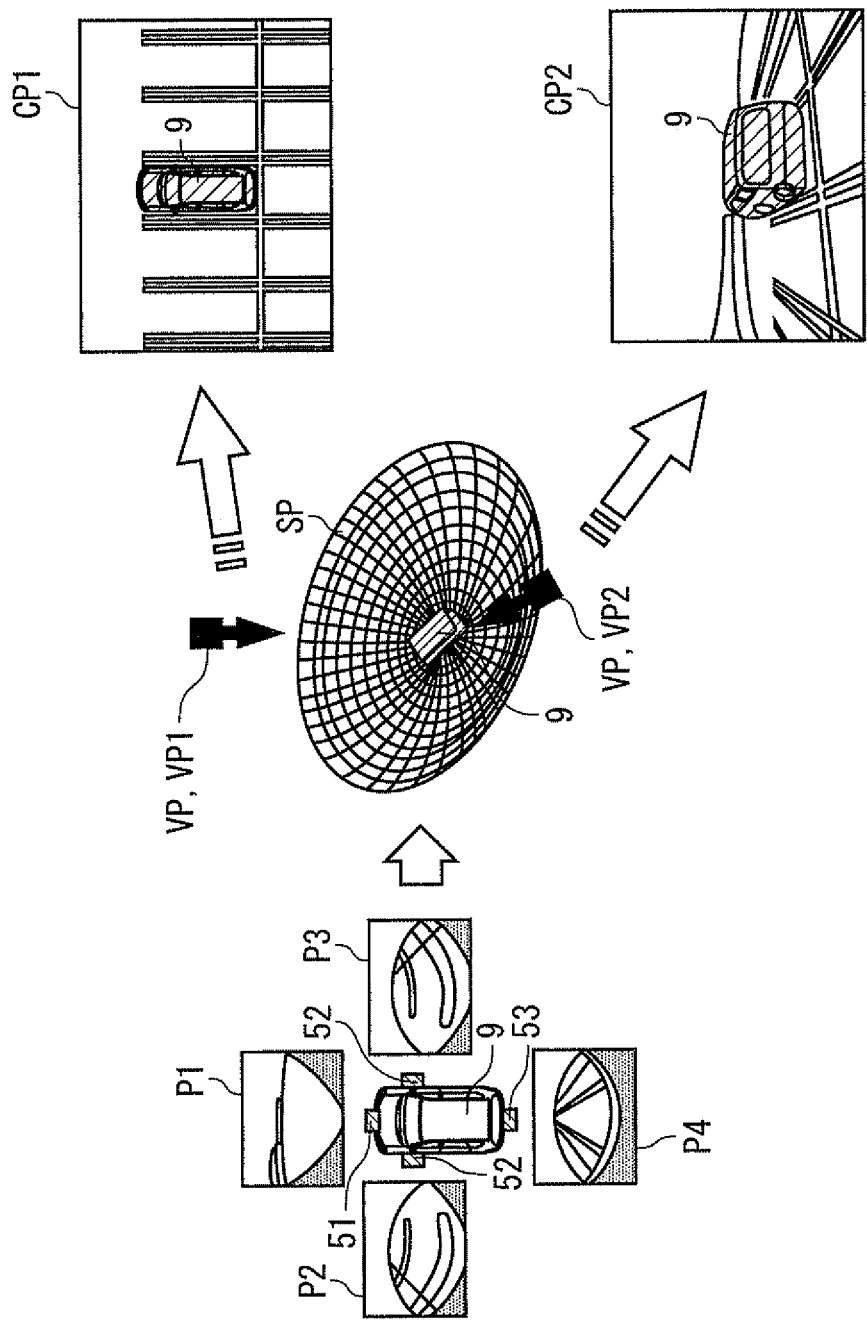
FIG. 3 is an explanatory view of a method for generating a synthetic image viewed from a virtual viewpoint.

Next, how the synthetic image generating section 32 of the image processing section 3 generates a synthetic image viewed from a certain virtual viewpoint based on a plurality of captured images that have been obtained from the capturing section 5. FIG. 3 is an explanatory view of a method of generating a synthetic image viewed from a certain virtual viewpoint.

When the front camera 51, the side cameras 52, and the back camera 53 of the capturing section 5 capture images at the same time, four captured images P1 to P4 presenting the front side, the left and right directions, and the rear side of the vehicle 9, respectively, are acquired. That is, the four captured images P1 to P4 acquired from the capturing section 5 include information presenting the entire circumference of the vehicle 9 at the capturing time.

After the four captured images P1 to P4 are multiplexed, they are projected onto an imaginary three-dimensional curved surface SP. For example, the three-dimensional curved surface SP is substantially in a hemisphere (bowl) shape. The central part of the three-dimensional curved surface SP (bottom part of a bowl) is set as a position of the vehicle 9. A corresponding relation between a position of each pixel included in the captured images P1 to P4 and a position of each pixel of the three-dimensional curved surface SP is predetermined. Accordingly, a value for each pixel of the three-dimensional curved surface SP can be determined based on the corresponding relation and a value for each pixel included in the captured images P1 to P4. The corresponding relation between a position of each pixel of the captured images P1 to P4 and a position of each pixel of the three-dimensional curved surface SP is stored as table data in the non-volatile memory 11 of the control section 1 or others.

Meanwhile, a virtual viewpoint VP to the three-dimensional curved surface SP is set by the control section 1 at a certain viewpoint position in the vicinity of the vehicle toward a certain visual field direction. The virtual viewpoint VP is defined with the viewpoint position and the visual field direction. In accordance with the set virtual viewpoint VP, a necessary area on the three-dimensional curved surface SP is cut out as an image, so that a synthetic image viewed from the certain virtual viewpoint is generated.

For example, in case of setting a virtual viewpoint VP1, in which the viewpoint position is a position directly above substantially a center of the vehicle 9, and the visual field direction is substantially a direct downward direction, a synthetic image CP1 looking down the vehicle 9 from substantially directly above the vehicle 9 is generated. As illustrated in the same drawing, in case of setting a virtual viewpoint VP2, in which the viewpoint position is a left rear position of the vehicle 9, and the visual field direction is substantially a front direction of the vehicle 9, a synthetic image CP2 looking the entire periphery of the vehicle 9 from the left rear side of the vehicle 9 is generated. A relation between the virtual viewpoint VP and the necessary area on the three-dimensional curved surface SP is predetermined and stored as table data in the non-volatile memory 11 of the control section 1.

When a synthetic image is actually generated, there is no need to determine values for all pixels of the three-dimensional curved surface SP. Values only for pixels of the necessary area in correspondence to the set virtual viewpoint VP is determined based on the captured images P1 to P4, thereby increasing the processing speed.

An image of the vehicle 9 to be presented in a synthetic image is prepared in advance as data such as a bit map and stored in the non-volatile memory 11 or others. When a synthetic image is generated, data for the image of the vehicle 9 in the shape in accordance with the viewpoint position and the visual field direction of the virtual viewpoint VP of the synthetic image as described above are read, so that they are overlapped within the synthetic image. Meanwhile, in the drawing, the actual vehicle and the image of the vehicle to be presented in an image are denoted by the same reference numeral 9.

3. Operation Mode

Figure 4:
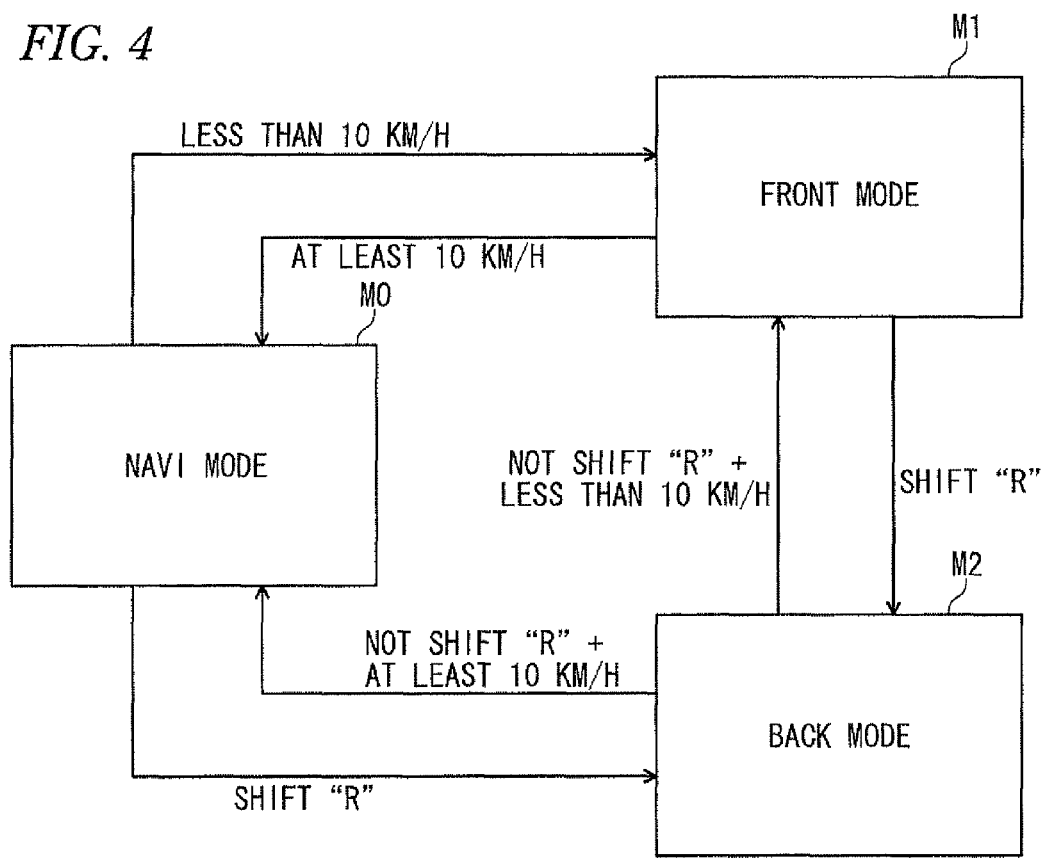
FIG. 4 is a view showing transition of an operation mode of the image display system.

Next, operation of the image display system 100 will be described. FIG. 4 is a view showing transition of an operation mode of the image display system 100. The image display system 100 has three operation modes that include a navi mode M0, a front mode M1, and a back mode M2. The operation modes are converted by control of the control section 1 in accordance with operation by the driver or a driving state.

The navi mode M0 is an operation mode that displays a map image for navigation guide or others on the display 21, through the function of the navigation apparatus 20. In the navi mode M0, the functions of the capturing section 5 and the image generating apparatus 10 are not used. Various displays are accomplished by the function of the navigation apparatus 20 as a single unit. Accordingly, if the navigation apparatus 20 has a function of receiving and displaying a TV broadcasting radio wave, instead of the map image for navigation guide, a TV broadcasting screen may be displayed.

The front mode M1 and the back mode M2 are operation modes that display a display image presenting peripheral circumferences of the vehicle 9 in real time on the display 21, by using the functions of the capturing section 5 and the image generating apparatus 10. The front mode M1 is an operation mode that effectuates a function of a front monitor to display a display image primarily presenting a front region or a side region of the vehicle 9, which is necessary upon advancing the vehicle 9. The back mode M2 is an operation mode that effectuates a function of a back monitor to display a display image primarily presenting a rear region of the vehicle 9, which is necessary upon reversing the vehicle 9.

In case of the navi mode M0, for example, if the driving speed input from the vehicle speed sensor 82 is less than 10 km/h, the navi mode M0 is converted into the front mode M1. In case of the front mode M1, for example, if the driving speed is at least 10 km/h, the front mode M1 is converted into the navi mode M0.

If the driving speed of the vehicle 9 is relatively high, the front mode M1 is released to enable the driver to concentrate on the driving. Reversely, if the driving speed of the vehicle 9 is relatively low, it is highly likely that the driver is performing driving in consideration of peripheral circumstances of the vehicle 9, e.g., entering into a crossroad where views are poor, changing a direction, and moving toward a roadside. Accordingly, when the driving speed is relatively low, the operation mode is converted into the front mode M1 primarily presenting a front region or a side region of the vehicle 9. Meanwhile, in the case where the operation mode is converted from the navi mode M0 into the front mode M1, a condition that an explicit operation instruction has been made from the driver may be added to the condition that the driving speed is less than 10 km/h.

In case of the navi mode M0 or the front mode M1, if a position of the shift lever input from the shift sensor 81 is "R (reversing)," the navi mode M0 or the front mode M1 is converted into the back mode M2. In other words, when the transmission of the vehicle 9 is operated to be positioned at "R (reversing)," the vehicle 9 is in the reversing state, so that the operation mode is converted into the back mode M2 primarily presenting a rear region of the vehicle 9.

In case of the back mode M2, when the position of the shift lever is a position other than "R (reversing)," the back mode M2 is converted into the navi mode M0 or the front mode M1 depending on the driving speed at that time. If the driving speed is at least 10 km/h, the back mode M2 is converted into the navi mode M0. If the driving speed is less than 10 km/h, the back mode M2 is converted into the front mode M1.

Hereinafter, an aspect for displaying the periphery of the vehicle 9 in each of the front mode M1 and the back mode M2 will be described in detail.

4. Front Mode

Figure 5:
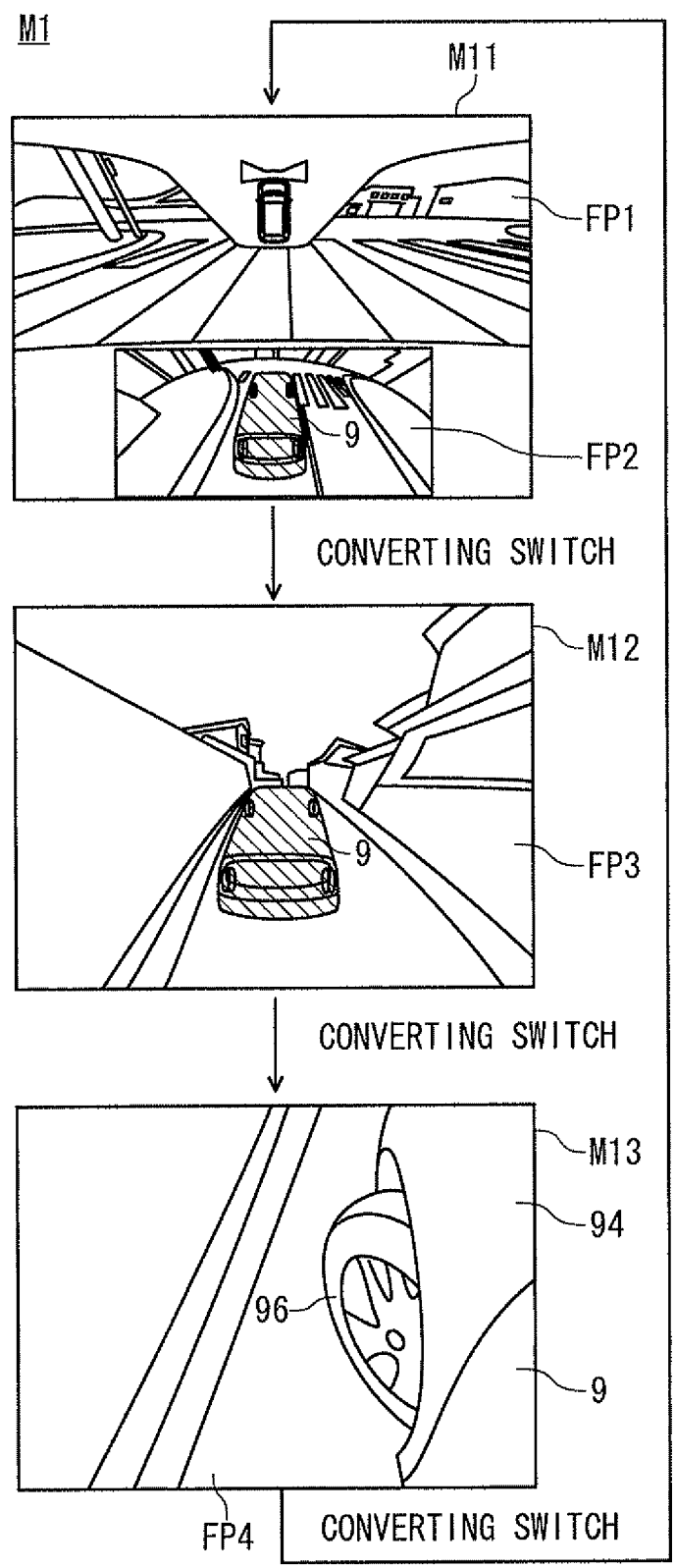
FIG. 5 is a view showing transition of a display mode in a front mode.

First, a display aspect of the front mode M1 will be described. FIG. 5 is a view showing transition of a display mode in the front mode M1. The front mode M1 includes three display modes, i.e., a binary image mode M11, a single image mode M12, and a side camera mode M13. The display modes are different in a display aspect. Each time the driver presses the converting switch 85, the display modes are converted into the binary image mode M11, the single image mode M12, and the side camera mode M13 in this order by control of the control section 1. In case of the side camera mode M13, when the converting switch 85 is pressed, the side camera mode 13 is returned again to the binary image mode M11.

The binary image mode M11 is a display mode that displays a display image including a front image FP1 obtained from capturing in the front camera 51 and a synthetic image FP2 viewed from the virtual viewpoint VP side by side on the display 21. In the binary image mode M11, two images, i.e., the front image FP1 and the synthetic image FP2 are displayed on the same screen.

The single image mode M12 is a display mode that displays a display image including only a synthetic image FP3 viewed from the virtual viewpoint VP on the display 21. The side camera mode M13 is a display mode that displays a display image including only a side image FP4 obtained from capturing in the side cameras 52 on the display 21.

4-1.2 Image Mode

4-1-1. Visual Field Scope

In the binary image mode M11, the display image generating section generates the display image including the front image FP1 captured by the front camera 51 and the synthetic image FP2 generated by the synthetic image generating section 32 and the communication section 42 outputs the generated display image to the navigation apparatus 20.

Figure 6:
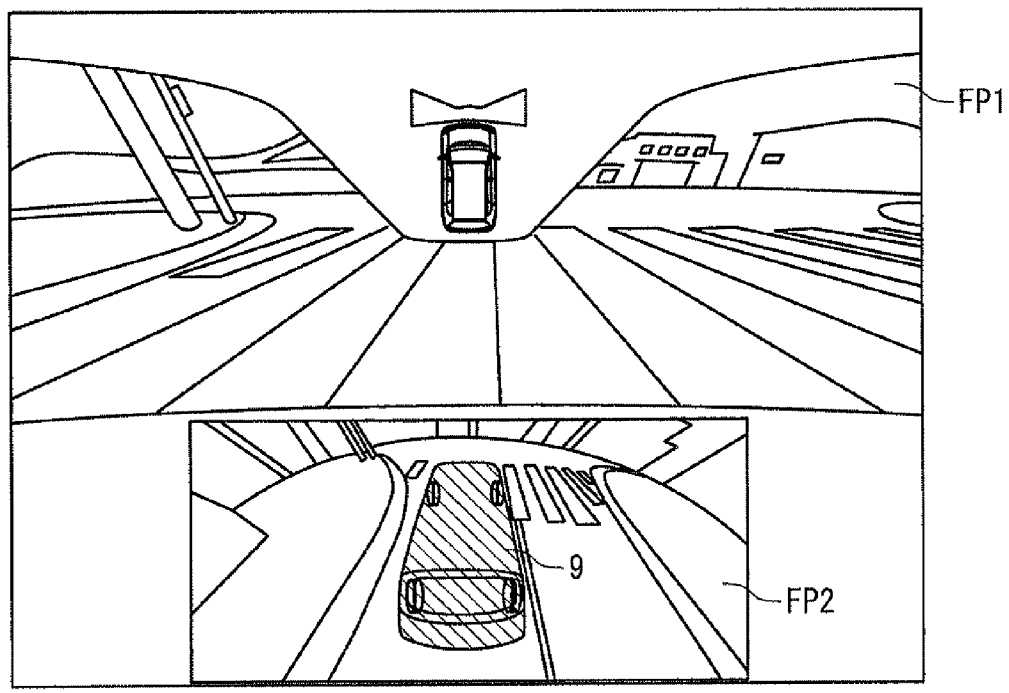
FIG. 6 is a view showing an example of a display image of a binary image mode.

FIG. 6 is a view showing an example of a display image to be displayed on the display 21 in the binary image mode M11. As illustrated in FIG. 6, on a display image of the binary image mode M11, a front image FP1 is disposed at an upper part, and a synthetic image FP2 is disposed at a lower part. The front image FP1 is not a synthetic image from the virtual viewpoint VP, but is a display image obtained in the manner that a captured image obtained from capturing in the front camera 51 is adjusted in the image adjusting section 31 to be a display image. The synthetic image FP2 is a synthetic image that includes the side region of the vehicle 9 viewed from the virtual viewpoint VP directed from the rear position of the vehicle 9 toward the front of the vehicle 9.

Figure 7:
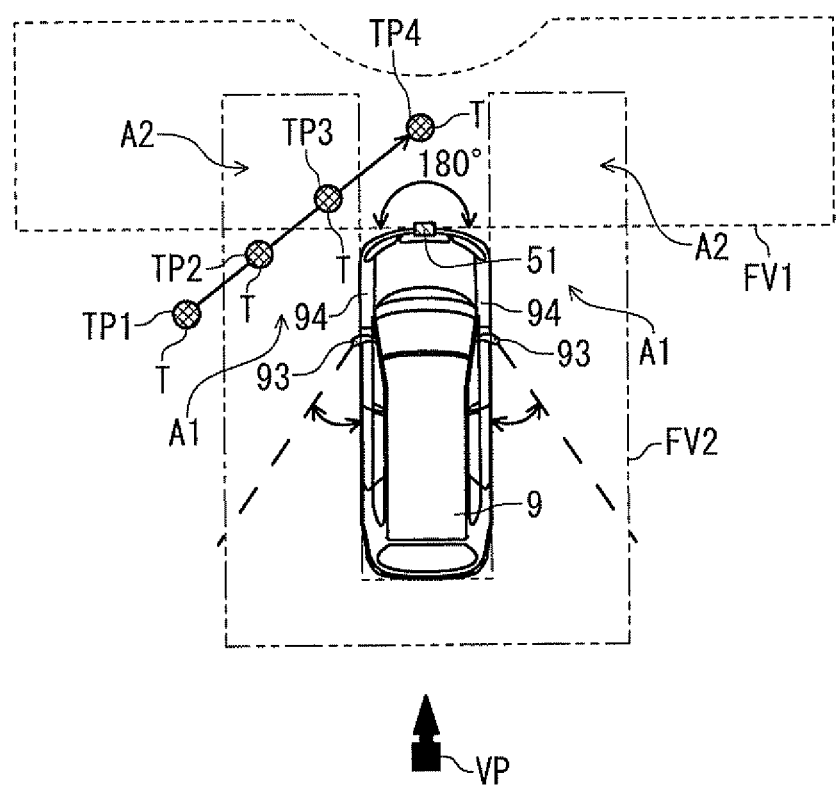
FIG. 7 is an explanatory view of a visual field scope presented in a binary image mode.

FIG. 7 is an explanatory view of a visual field scope presented in the binary image mode M11 in the vicinity of the vehicle 9. In FIG. 7, a scope FV1 presented by a dashed line is a visual field scope presented on the front image FP1. A scope FV2 presented by a chain double-dashed line is a visual field scope presented on the synthetic image FP2. The visual field scopes FV1 and FV2 partially overlap with each other in an area A2, which is a boundary of the scopes.

On the front image FP1, an area of a 180° horizontal angle expanded in the left and right direction in the front region of the vehicle 9 is set as the visual field scope FV1. Accordingly, the driver sees the front image FP1 so that he/she can recognize an object existing in the left and right front sides of the vehicle 9 that can be easily blinded when entering into a crossroad where views are poor.

On the synthetic image FP2, a scope that includes the left and right side regions of the vehicle 9 from the front of the front end of the vehicle 9 to the rear of the rear end of the vehicle 9, and the rear region of the vehicle 9 is set as the visual field scope FV2. Accordingly, the driver sees the synthetic image FP2 so that he/she can recognize an object existing in the side regions or the rear region. When performing changing a direction, moving toward a roadside, or others, the driver can easily monitor an area that may be easily blinded from the driver's seat, e.g., an area A1 near the outside of a front fender 94 that is not seen on the door mirror 93.

In the binary image mode M11, the two images FP1 and FP2 of the visual field scopes FV1 and FV2 can be seen at the same time without converting a screen (refer to FIG. 6), so that the driver can monitor peripheral circumstances of the vehicle 9 at once.

The viewpoint position of the virtual viewpoint VP of the synthetic image FP2 is set to the rear position of the vehicle 9. The visual field direction is set to the front direction of the vehicle 9. Accordingly, as illustrated in FIG. 6, the synthetic image FP2 shows the periphery of the vehicle 9 in the state that the vehicle 9 is viewed from the rear position of the vehicle 9 toward the front direction, together with the image of the vehicle 9. Since the visual field direction of the front image FP1, the visual field direction of the synthetic image FP2, and the visual field direction of the driver are substantially identical, the driver is not confused of the direction toward which an object presented on the image exists. The driver does not need to make complicated thinking such as conducting coordinate transformation in his/her mind, so that the driver can intuitively recognize the positional relation between an object displayed on the display 21 and the vehicle 9.

Compared to the case of using an image looking down the vehicle 9 from directly above the vehicle 9, the positional relation regarding to which portion of the vehicle 9 an object around the vehicle 9 is closed is easily recognized. On the synthetic image FP2 viewed from the virtual viewpoint directed from the rear position of the vehicle 9 toward the front direction, the front region that is an advancing direction of the vehicle 9, as well as the side region of the vehicle 9 are presented. Accordingly, compared to the case of using an image looking down the vehicle 9 from directly above the vehicle 9, it is easily predicted how the positional relation between the vehicle 9 and an object around the vehicle 9 varies depending on advancing of the vehicle 9. Accordingly, when the vehicle 9 is advanced, the vehicle 9 is effectively prevented from contacting with an object around the vehicle 9.

Figure 8:
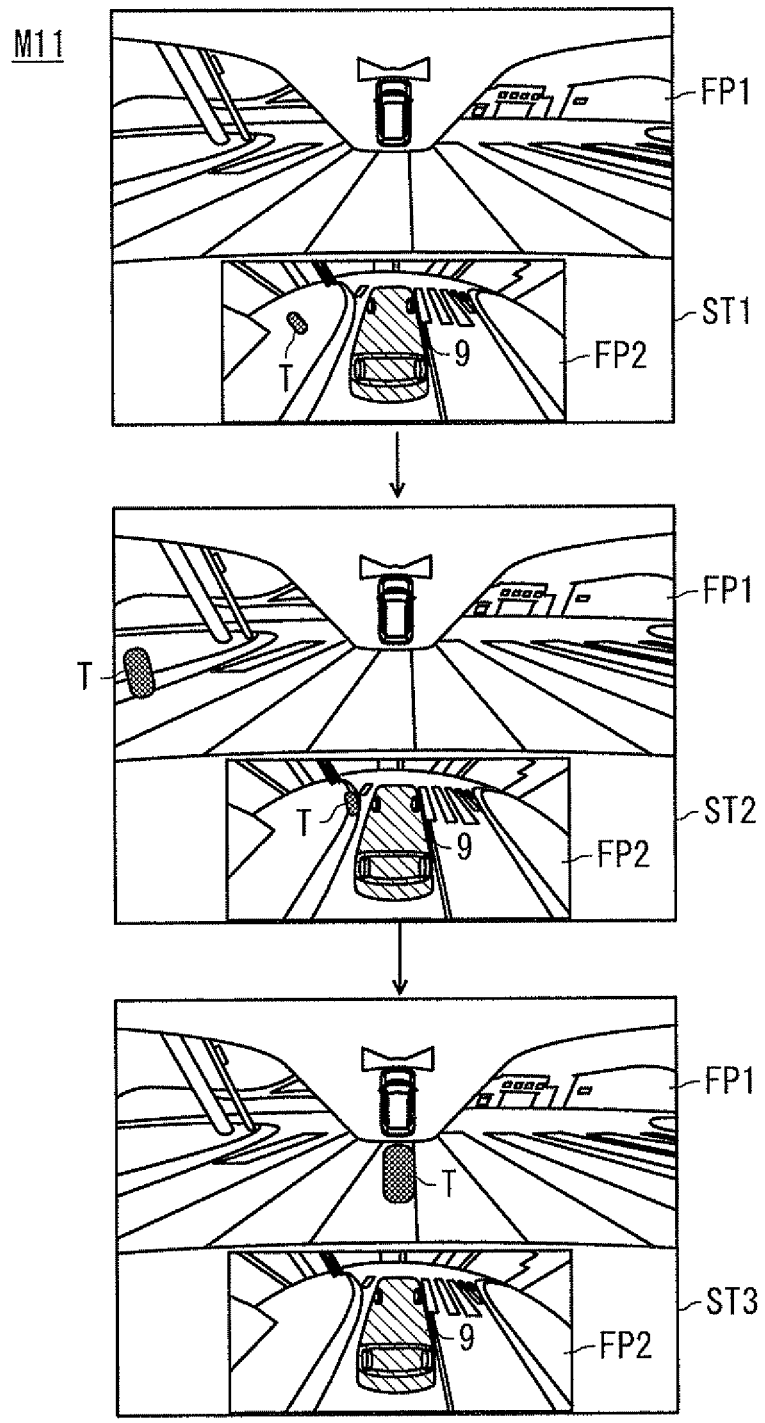
FIG. 8 is a view showing an example of screen display in a binary image mode.

As illustrated in FIG. 7, it is assumed that a certain object T moves around the vehicle 9 over the visual field scopes FV1 and FV2 of the two images FP1 and FP2. Specifically, the object T moves from a position TP1 out of the visual field scope of the binary image mode M11 to a position TP2 of the area A1 within the visual field scope FV2, to a position TP3 within the overlapping area A2 of the visual field scope FV1 and the visual field scope FV2, and finally, to a position TP4 of the front side of the vehicle 9 within the visual field scope FV1. FIG. 8 is a view showing an example of screen display of the display 21 in the binary image mode M11, in the case where the object T moves as described above.

When the object T moves from the position TP1 out of the visual field scope to the position TP2 within the visual field scope FV2 of the synthetic image FP2, the object T first appears on the synthetic image FP2 of the lower portion of the screen (state ST1). At this viewpoint, the object T has not appeared on the front image FP1 of the upper portion of the screen. Subsequently, when the object T moves to the position TP3 within the overlapping area A2 of the visual field scope FV1 and the visual field scope FV2, the object T appears on both the front image FP1 and the synthetic image FP2 (state ST2). When the object T moves into the position TP4 within the visual field scope FV1 of the front image FP1, the object T appears on the front image FP1 (state ST3).

Even in the case where the object T moves over the visual field scopes FV1 and FV2 of the two images FP1 and FP2 around the vehicle 9, since the visual field direction of the front image FP1 and the visual field direction of the synthetic image FP2, and the visual field direction of the driver are substantially identical, the object T moves in substantially the same direction on any of the two images FP1 and FP2. Accordingly, the driver can intuitively recognize the movement of the object T. Since there is the area A2 that is a boundary where the visual field scope FV1 and the visual field scope FV2 overlap with each other, there is a scene where the object T appears on both the front image FP1 and the synthetic image FP2 at the same time. Accordingly, the movement of the object T can be recognized in a continuous manner.

In the binary image mode M11, much information is provided to the driver. However, the driver can intuitively recognize peripheral circumstances of the vehicle 9 as described above. Accordingly, the driver can made an exact decision so that driving safety can be sufficiently assured.

4-1-2. Interaction of Operation of a Direction Instructing Device

Figure 9:
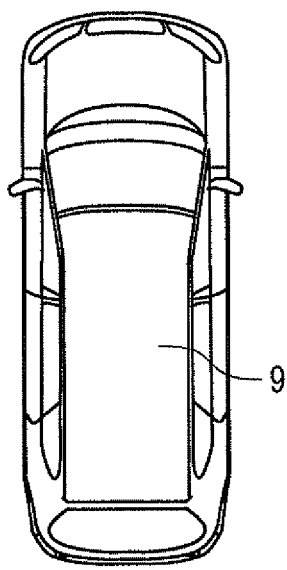
FIG. 9 is a view showing transition of a viewpoint position of a virtual viewpoint.
Figure 9:
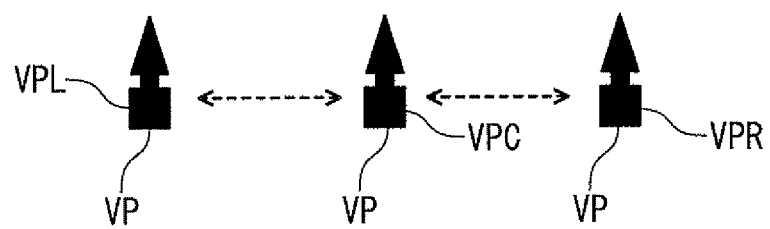

In the binary image mode M11, the viewpoint position of the virtual viewpoint VP of the synthetic image FP2 moves by control of the control section 1, in response to driver's operation to the winker switch of the direction instructing device 83. FIG. 9 is a view showing transition of the viewpoint position of the virtual viewpoint VP.

If a turn signal input from the direction instructing device 83 is off, namely, the direction instruction is not input by the signal input section 41, the viewpoint position of the virtual viewpoint VP is set to a position VPC substantially in a center of the left and the right at the rear of the vehicle 9, and the visual field direction is set to the front direction of the vehicle 9. Accordingly, as illustrated in FIG. 6, the synthetic image FP2 in which the left side region of the vehicle 9 is displayed in a size substantially equal to the right side region is generated.

Figure 10:
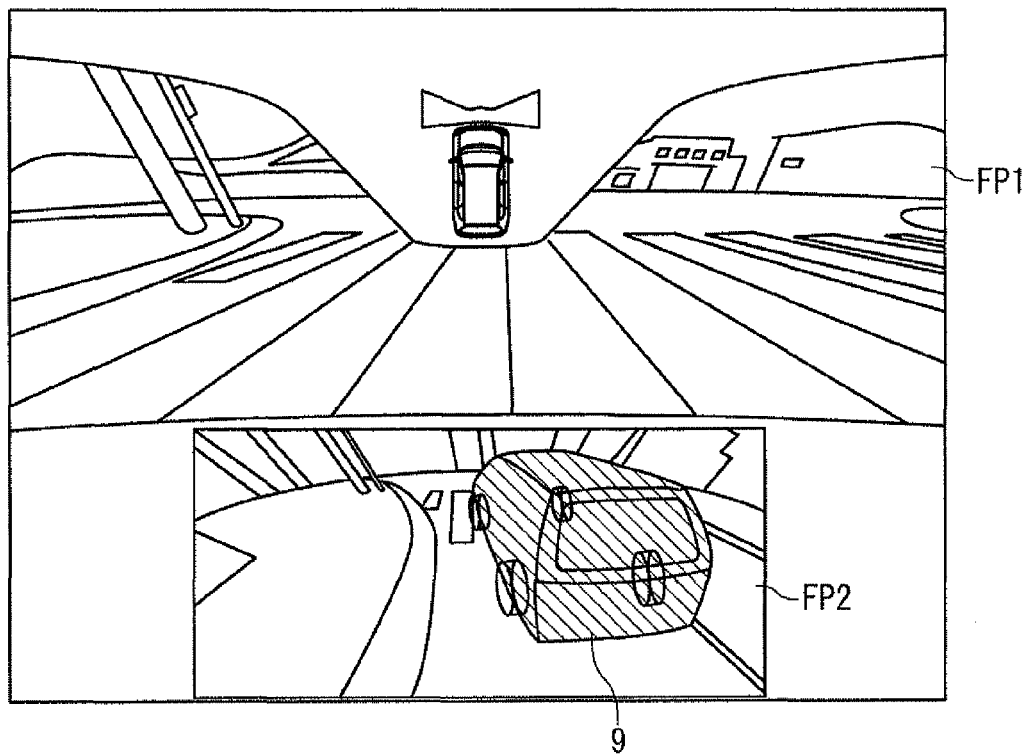
FIG. 10 is a view showing an example of a display image of a binary image mode.

If the turn signal input from the direction instructing device 83 is on, namely, the direction instruction is input by the signal input section 41, the viewpoint position of the virtual viewpoint VP moves into the position of the direction indicated by the turn signal, in the state that the visual field direction of the virtual viewpoint VP is set to the front direction of the vehicle 9. Specifically, if the turn signal indicates a left direction, the viewpoint position of the virtual viewpoint VP is set to a position VPL of the left side of the vehicle 9. Accordingly, as illustrated in FIG. 10, the synthetic image FP2 in which the left side region of the vehicle 9, indicated by the turn signal of the direction instructing device 83 is displayed in a size larger than the right side region is generated and displayed on the display 21. In this case as well, the synthetic image FP2 shows the periphery of the vehicle 9 in the state that the vehicle 9 is viewed from the rear position of the vehicle 9 to the front direction.

Figure 11:
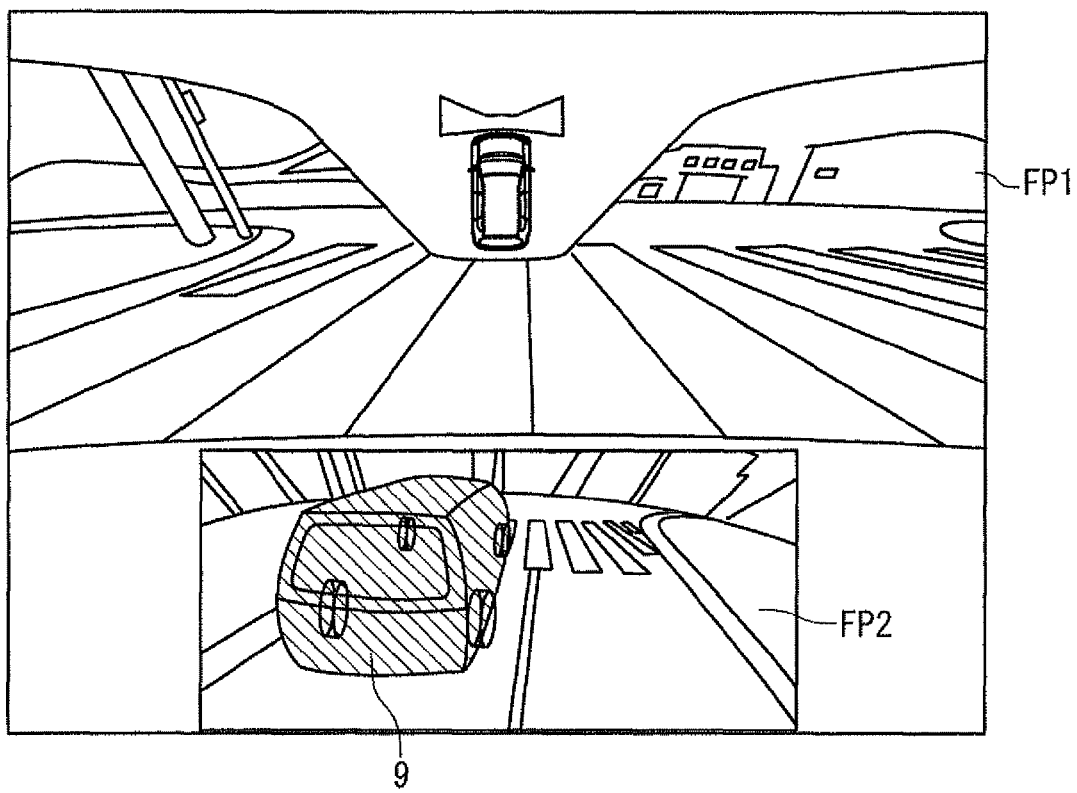
FIG. 11 is a view showing an example of a display image of a binary image mode.

If the turn signal indicates a right direction, the viewpoint position of the virtual viewpoint VP is set to a position VPR of the right side of the vehicle 9. Accordingly, as illustrated in FIG. 11, the synthetic image FP2 in which the right side region of the vehicle 9, indicated by the turn signal of the direction instructing device 83 is displayed in a size larger than the left side region is generated and displayed on the display 21. In this case as well, the synthetic image FP2 shows the periphery of the vehicle 9 in the state that the vehicle 9 is viewed from the rear position of the vehicle 9 to the front direction.

In the direction instructed by the direction instructing device 83, there is most likely an object, with which the vehicle 9 may contact when the vehicle 9 moves upon changing a direction or moving toward a roadside. The side region of the direction instructed by the direction instructing device 83 is widely presented, so that the driver can pay his/her attention to the object with which the vehicle 9 may contact. Accordingly, the vehicle 9 can be effectively prevented from contacting with the object.

In this case as well, the synthetic image FP2 shows the periphery of the vehicle 9 in the state that the vehicle 9 is viewed from the rear position of the vehicle 9 to the front direction, together with the image of the vehicle 9. Since the side region of the vehicle 9 appears in the same visual field direction as the visual field direction of the driver, the driver is not confused of the direction, toward which an object presented in an image exists. The driver does not make complicated thinking such as conducting coordinate transformation in his/her mind, so that the driver can intuitively recognize the positional relation between the vehicle 9 and an object. In addition, the driver can easily recognize the positional relation regarding to which portion of the vehicle 9 an object around the vehicle 9 is closed. The driver can easily predict how the positional relation between the vehicle 9 and an object around the vehicle 9 varies depending on driving of the vehicle 9. Accordingly, the driver can make an exact decision in a moment.

Even in the case where the viewpoint position of the virtual viewpoint VP is moved to the left or right side of the vehicle 9, the synthetic image also includes a side region in a reverse direction to one direction indicated by the turn signal. Accordingly, even if an object has existed in a side region in a reverse direction to a direction indicated by the turn signal, the object can be recognized. For example, in the case of temporarily operating the steering wheel in a reverse direction to a direction indicated by the turn signal in order to avoid an object existing in the direction indicated by the turn signal, it is possible to prevent contact with an object existing in the reverse direction.

However, if the winker switch is returned from the operation position to the neutral position, so that the turn signal from the direction instructing device 83 is converted from on to off, the viewpoint position of the virtual viewpoint VP of the synthetic image FP2 is returned to the position VPC substantially in a center of the left and the right. In this case, when the input signal section 41 stops inputting the direction instruction, the synthetic image generating section 32 continues to generate the synthetic image FP2 for a predetermined time. And the direction instruction is not input for the predetermined time, the synthetic image generating section 32 starts generating the synthetic image FP1 after the predetermined time. That is, the viewpoint position of the virtual viewpoint VP is returned to the position VPC substantially in a center of the left and the right, after a predetermined time elapses while the turn signal is off, and not immediately after a turn signal is converted from on to off.

Figure 12:
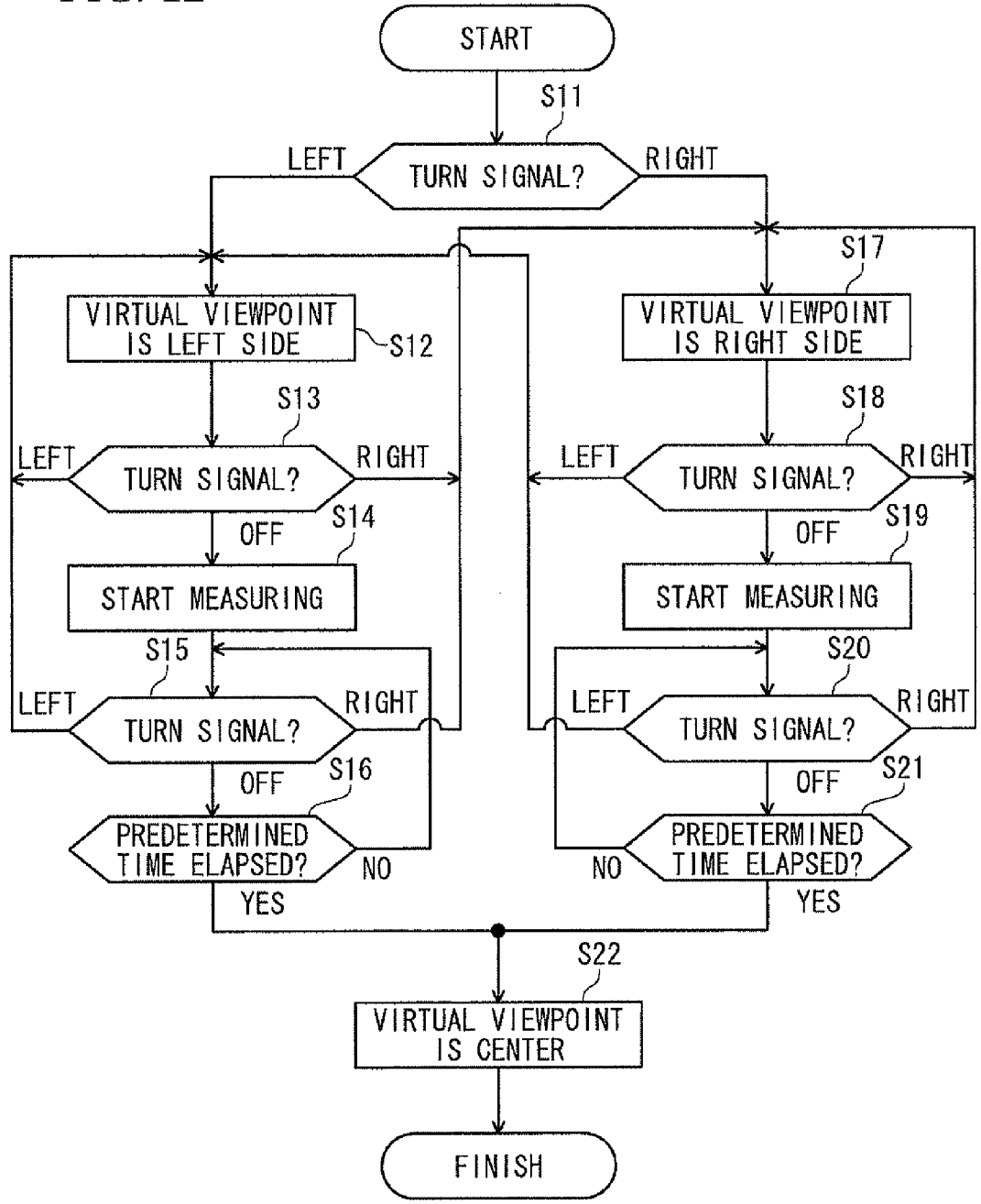
FIG. 12 is a view showing flow of processing to change a viewpoint position of a virtual viewpoint.

FIG. 12 is a view showing flow of processing for changing the viewpoint position of the virtual viewpoint VP. This processing is carried out by control of the control section 1 when the winker switch is operated such that the turn signal is on.

First, a direction indicated by the turn signal of the direction instructing device 83 is determined (S11). If the turn signal indicates a left direction, S12 is carried out. If the turn signal indicates a right direction, S17 is carried out.

In S12, the virtual viewpoint VP is set to the position VPL of the left side. Accordingly, as illustrated in FIG. 10, the synthetic image FP2 that more widely shows the side region of the left direction than the right direction is generated and displayed on the display 21.

Subsequently, in the state that the virtual viewpoint VP is set to the position VPL of the left side, the turn signal state is monitored (S13). If the state that the turn signal indicates a left direction has been maintained, the processing is returned to S12 so that the virtual viewpoint VP is maintained as the position VPL of the left side. In other words, displaying the synthetic image FP2 that relatively widely shows the side region of the left direction is maintained. Meanwhile, if the turn signal indicates a right direction, S17 is carried out.

In S13, if the turn signal is off, namely, a direction instruction has been changed into no direction instruction, measuring by a timer 12 at the time that the turn signal becomes off is started (S14).

The turn signal state is monitored, until a predetermined time elapses from the starting of the measuring (S15 and S16). In the present embodiment, for example, the predetermined time is three seconds. Until the predetermined time elapses, the virtual viewpoint VP is maintained as the position VPL of the left side. And, displaying the synthetic image FP2 that relatively widely shows the side region of the left direction is maintained. If the predetermined time elapses in the state that the turn signal is off (Yes in S16), the viewpoint position of the virtual viewpoint VP is returned to the position VPC substantially in a center of the left and the right (S22). Accordingly, the synthetic image FP2 that substantially equally includes the left and right side regions of the vehicle 9 is displayed.

However, if the turn signal indicates a left direction again in S15, until the predetermined time elapses from the starting of the measuring, the processing is returned to S12 so that the state that the virtual viewpoint VP is the position VPL of the left side is maintained. In other words, displaying the synthetic image FP2 that relatively widely shows the side region of the left direction is maintained. Meanwhile, if the turn signal indicates a right direction in S15, S17 is carried out.

In case of performing changing a direction or moving toward a roadside, the steering wheel is minutely operated. Accordingly, there is a case where the winker switch of the direction instructing device 83 is returned from the operation position to the neutral position, irrespective of the intension of the driver. Thus, the driver continuously operates the winker switch of the direction instructing device 83 in the same direction for a short time. In this case, if the viewpoint position of the virtual viewpoint VP is immediately changed in response to on/off of the turn signal, the viewpoint position of the synthetic image FP2 displayed on the display 21 is frequently converted, so that seeing the synthetic image FP2 becomes difficult. Accordingly, even if the turn signal is off, the viewpoint position of the virtual viewpoint VP should be maintained until the predetermined time elapses, and the viewpoint position of the virtual viewpoint VP should be returned to the position VPC substantially in a center of the left and the right under the condition that the predetermined time has elapsed in the state that the turn signal is off. Accordingly, the occasion that seeing the synthetic image FP2 becomes difficult can be prevented.

As the predetermined time used for the determination is short, it is likely that the viewpoint position of the synthetic image FP2 is frequently converted. As the predetermined time used for the determination is long, the viewpoint position of the synthetic image FP2 is not easily returned to substantially the center. Accordingly, the predetermined time is preferably set to two to four seconds.

The case where the turn signal indicates a left direction has been described. However, the case where the turn signal indicates a right direction is different from the case where the turn signal indicates a left direction only in terms of the left or right direction, and undergoes the same processing as that for the case where the turn signal indicates a left direction. In other words, in S17, the virtual viewpoint VP is set to the position VPR of the right side. Accordingly, as illustrated in FIG. 11, the synthetic image FP2 that more widely shows the side region of the right direction than the left direction is generated and displayed on the display 21.

Subsequently, in the state that the virtual viewpoint VP is set to the position VPR of the right side, the turn signal state is monitored (S18). If the state that the turn signal indicates a right direction is maintained, the processing is returned to S17, so that the virtual viewpoint VP is maintained as the position VPR of the right side. If the turn signal indicates a left direction, S12 is carried out.

In S18, if the turn signal is off, measuring by the timer 12 at the time that the turn signal becomes off is started (S19), and the turn signal state is monitored until the predetermined time elapses from the starting of the measuring (S20 and S21). At this time, until the predetermined time elapses, the virtual viewpoint VP is maintained as the position VPR of the right side. If the predetermined time has elapsed in the state that the turn signal is off (Yes in S21), the viewpoint position of the virtual viewpoint VP is returned to the position VPC substantially in a center of the left and the right (S22). Accordingly, the synthetic image FP2 that substantially equally includes the side regions of the left and right sides of the vehicle 9 is displayed.

However, if the turn signal indicates a right direction again in S20, until the predetermined time elapses from the starting of the measuring, the processing is returned to S17, so that the state that the virtual viewpoint VP is the position VPR of the right side is maintained. In other words, displaying the synthetic image FP2 that relatively widely shows the side region of the right direction is maintained. Meanwhile, if the turn signal indicates a left direction in S20, S12 is carried out.

4-2. Single Image Mode

Returning to FIG. 5, a display aspect in the single image mode M12 will be described. In the single image mode M12, the display 21 displays only the synthetic image FP3. The viewpoint position of the virtual viewpoint VP is set to the position substantially in a center of the left and the right at the rear of the vehicle 9, and the visual field direction is set to the front direction of the vehicle 9. Accordingly, the synthetic image FP3 shows the left and right side regions of the vehicle 9 in the state that the vehicle 9 is viewed from the rear position of the vehicle 9 to the front direction. In the case where the vehicle 9 is driven to avoid an oncoming vehicle on a narrow road or the like, both the left and right sides of the vehicle 9 should be monitored. Accordingly, the single image mode M12 in the display aspect described above can be effectively used.

In the single image mode M12 as well, the visual field direction of the synthetic image FP3 is substantially the same as the visual field direction of the driver. Accordingly, the driver can intuitively recognize the positional relation between the vehicle 9 and an object displayed on the display 21.

Figure 13:
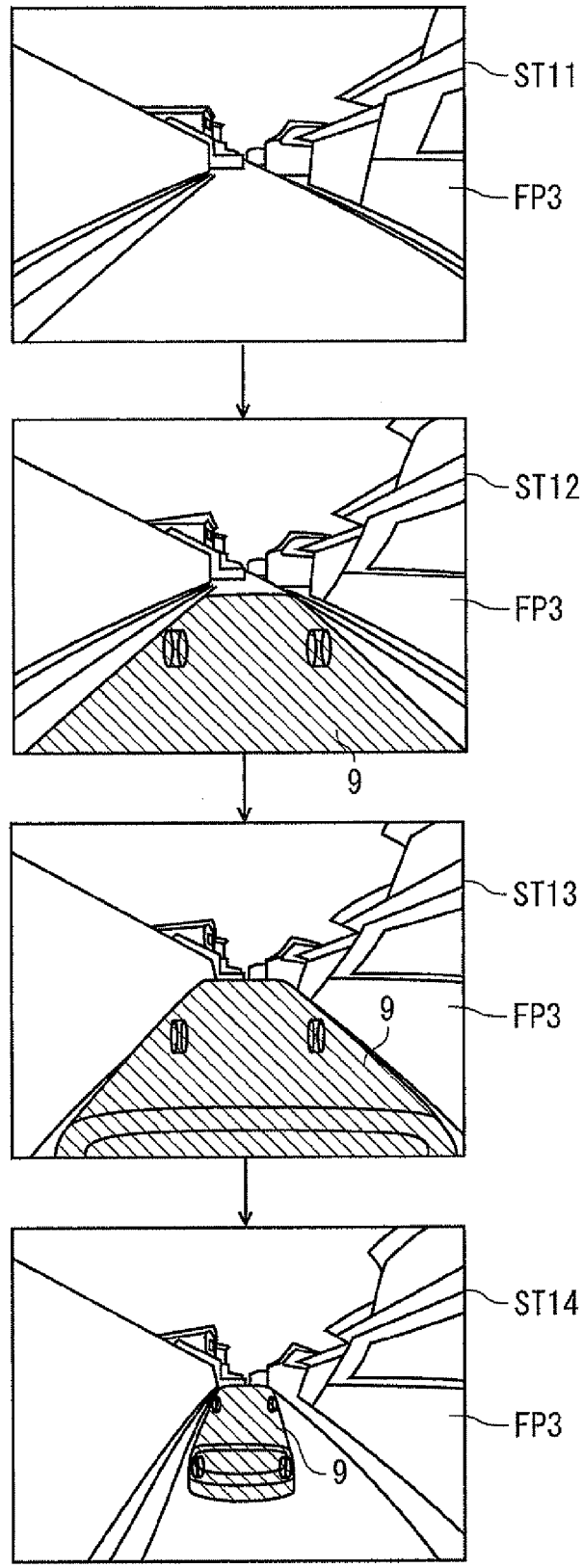
FIG. 13 is a view showing an example of screen display in a single image mode.
Figure 14:
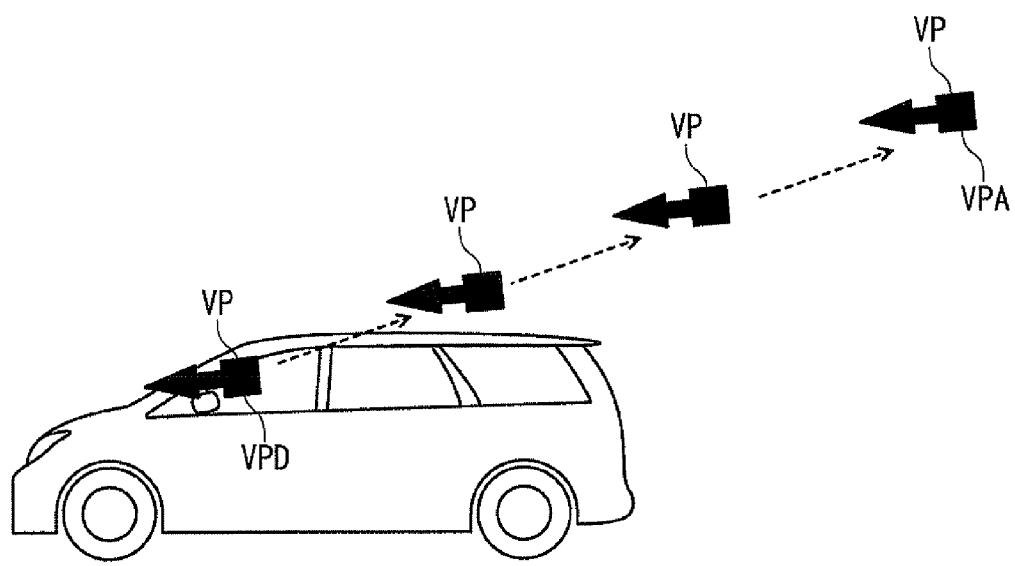
FIG. 14 is a view showing movement of a virtual viewpoint.

If the display mode has been converted into the single image mode M12, animation expression is implemented such that the virtual viewpoint VP of the synthetic image FP3 moves in the manner that a plurality of synthetic images FP3 are continuously displayed. FIG. 13 is a view showing an example of display in the case where animation expression is implemented in the single image mode 12. FIG. 14 is a view showing movement of the virtual viewpoint VP in that case.

As illustrated in FIG. 14, the viewpoint position of the virtual viewpoint VP is changed by the control section 1, such that the viewpoint position of the virtual viewpoint VP is straightly moved from a position VPD corresponding to the viewpoint of the driver to a position VPA at the rear of the vehicle 9. At this time, the synthetic image generating section 32 generates a plurality of synthetic images FP3 while sequentially moving the virtual viewpoint VP from the position VPD to the position VPA. In addition, the synthetic image generating section 32 generates an animation in which the virtual viewpoint VP is continuously moved by sequentially generating the plurality of synthetic images FP3. Parameters to generate the plurality of synthetic images FP3 are extracted by the control section 1 by Linear interpolation based on parameters for the position VPD prior to the change and parameters for the position VPA after the change. The plurality of generated synthetic images FP3 are output in turn to the navigation apparatus 20, and sequentially displayed on the display 21.

Accordingly, as illustrated in FIG. 13, animation expression is implemented on the display 21, such that the virtual viewpoint VP of the synthetic image FP3 moves from a position corresponding to the viewpoint of the driver to the rear position of the vehicle 9. On the synthetic image FP3, the image of the vehicle 9 does not appear (ST11) because an initial viewpoint is the viewpoint of the driver. However, an image of a top portion of the vehicle 9 gradually appears (ST12 and ST13). Finally, an image of the vehicle 9 looking down the vehicle 9 from the rear appears (ST14). The animation expression is implemented for about one second.

In the case where the position of the virtual viewpoint VP is changed, if the virtual viewpoint VP is momentarily converted, the driver cannot easily determine the position of the virtual viewpoint VP, from which the synthetic image is viewed. By implementing the animation expression as in the present embodiment, the driver can intuitively recognize the position of the virtual viewpoint VP, from which the synthetic image is viewed, compared to the case where the virtual viewpoint VP is momentarily converted.

When implementing the animation expression, a position corresponding to the viewpoint of the driver of the vehicle 9 is a reference position, such that the viewpoint position of the virtual viewpoint VP is moved from the reference position. Since the viewpoint position after the change of the virtual viewpoint VP is presented based on the viewpoint position of the driver, the viewpoint position after the change of the virtual viewpoint VP can be easily intuitively recognized. The reference position to start the animation expression may not be the position corresponding to the viewpoint of the driver, and may be a position that can be easily intuitively recognized by the driver. For example, the reference position may be a position directly above substantially a center of the vehicle 9 or a substantially central position of the left and the right of a front bumper.

The animation expression can be implemented under any circumstances, e.g., in the case where the virtual viewpoint VP is changed, as well as the display mode is changed. For example, in the aforementioned binary image mode M11, even in the case where the viewpoint position of the virtual viewpoint VP is changed in the left and right direction in response to operation of the direction instructing device 83, the animation expression is preferably implemented. In any case, it is preferable to generate a plurality of synthetic images, for which animation expression can be implemented through continuous display, while the position of the virtual viewpoint is sequentially moved. Parameters to generate the synthetic images may be extracted by Linear interpolation based on parameters for a position prior to the change and parameters for a position after the change. By using the animation expression, the driver can intuitively recognize the position of the virtual viewpoint VP after the change.

4-3. Side Camera Mode

Returning to FIG. 5, a display aspect in the side camera mode M13 will be described below. In the side camera mode, the display 12 displays only the side image FP4. The side image FP4 is not a synthetic image from the virtual viewpoint VP, but is a display image obtained in the manner that a captured image obtained from capturing in the side cameras 52 of the left side is adjusted by the image adjusting section 31 to be a display image.

For example, the position of the driver's seat in the vehicle 9 of the present embodiment is the right side. Accordingly, the outside region of the front fender 94 on the left side of the vehicle 9, which is opposite to the position of the driver's seat, may be easily blinded. Accordingly, in the side camera mode M13, the outside region of the front fender 94 of the left side is enlarged and presented. Accordingly, the state of an object existing in the blinded region can be easily recognized, compared to the other display modes.

Figure 15:
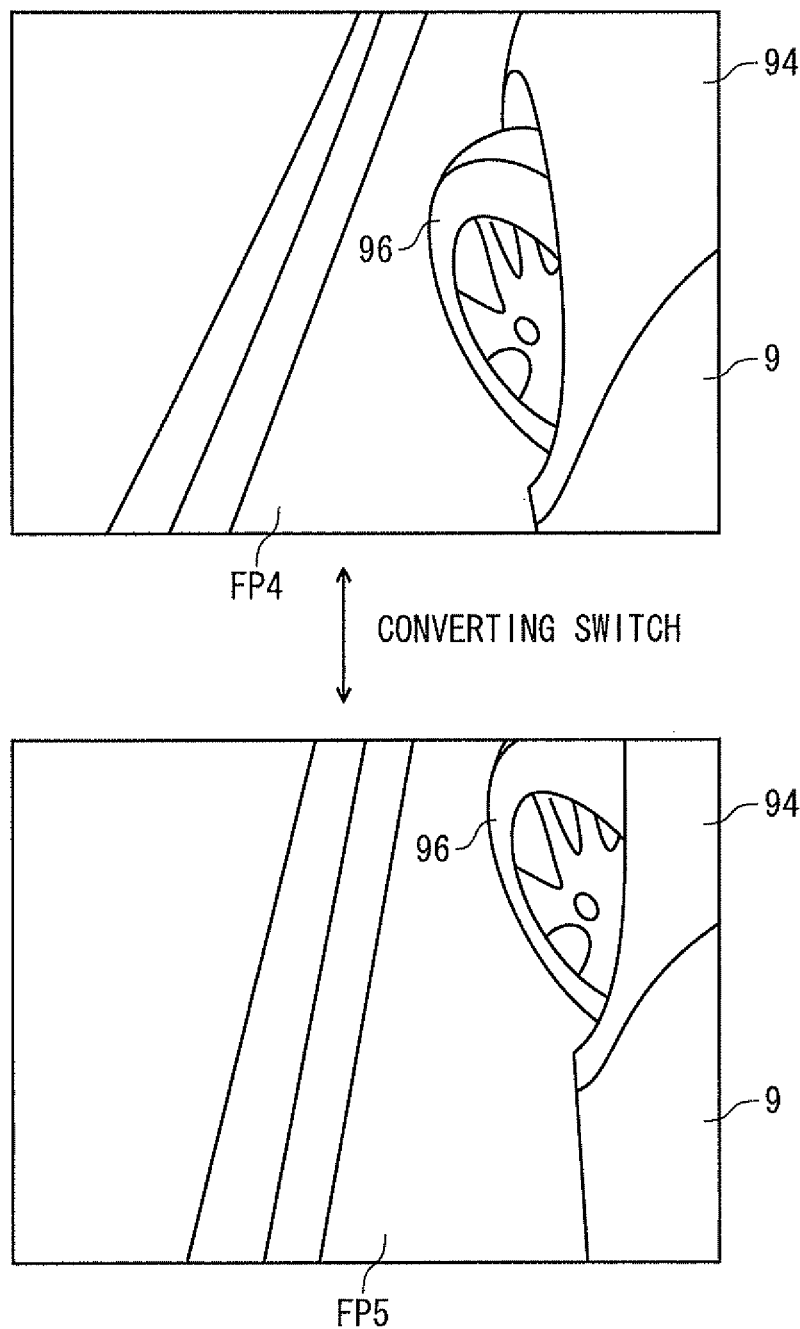
FIG. 15 is a view showing an example of screen display in a side camera mode.

As illustrated in FIG. 15, in the side camera mode M13, the converting switch 85 is pressed, so that the scope to be displayed on the display 21 can be converted. Specifically, conversion between the side image FP4, which enlarges and presents a region near a front wheel 96 of the left side of the vehicle 9, and the side image FP5, which enlarges and presents the rear region rather than the front wheel 96, is possible.

5. Back Mode

Figure 16:
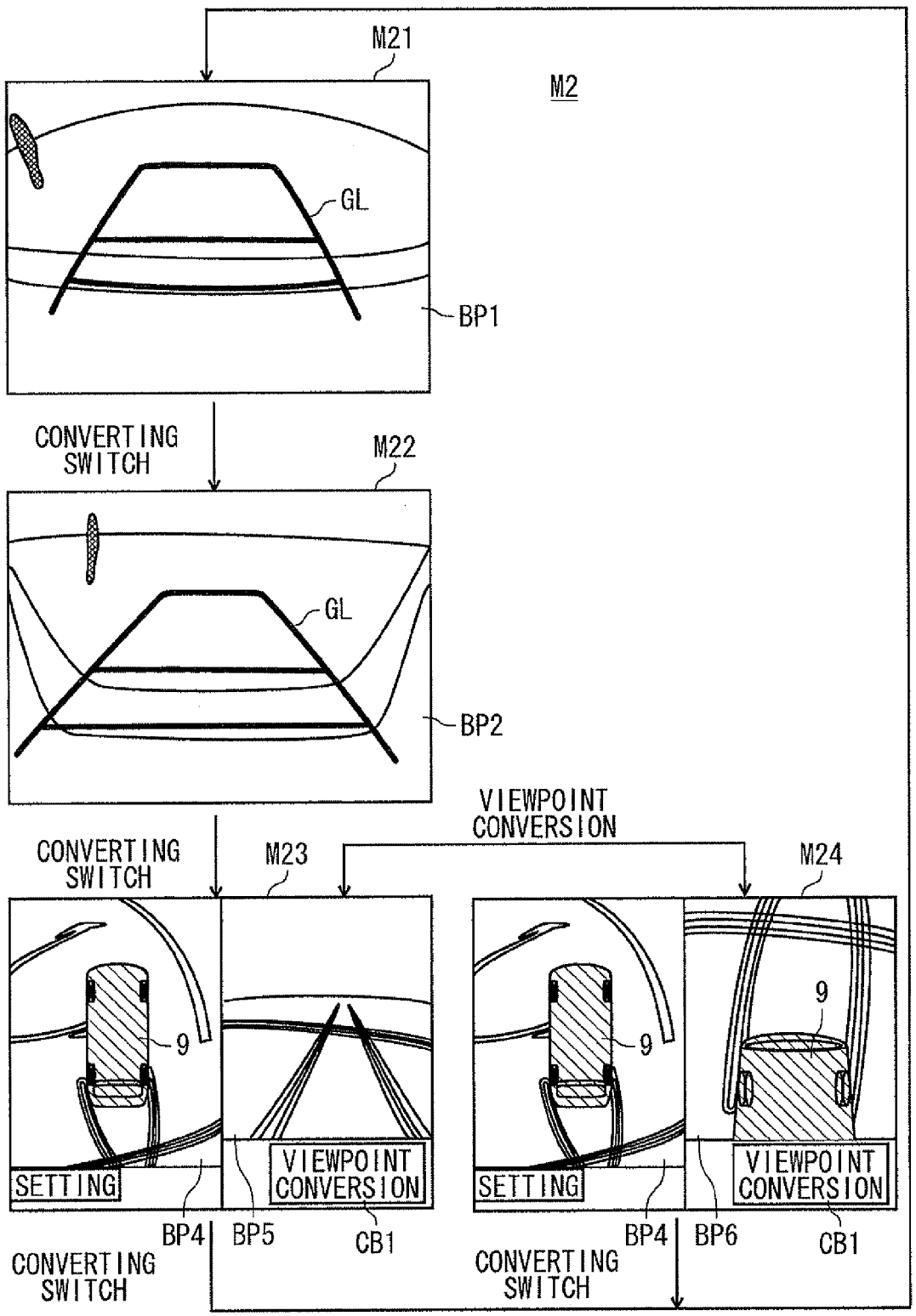
FIG. 16 is a view showing transition of a display mode in a back mode.

Hereinafter, a display aspect of the back mode M2, which is an operation mode when the position of the shift lever is "R (reversing)," will be described. FIG. 16 is a view showing transition of a display mode in the back mode M2. The back mode M2 includes four display modes, i.e., a standard mode M21, a wide mode M22, a synthetic standard mode M23, and a synthetic high angle mode M24. The modes are different in a display aspect. By performing predetermined operation, the driver can select certain one display mode and set the selected display mode as a current display mode (hereinafter, referred to as the "current mode").

Specifically, when the converting switch 85 is pressed, the current mode is set to the standard mode M21, the wide mode M22, and the synthetic standard mode M23 in this order. If the synthetic standard mode M23 is the current mode, when the converting switch 85 is pressed, the standard mode M21 is set as the current mode again. Instead of the converting switch 85, a command button on the screen may be pressed for conversion.

If the synthetic standard mode M23 is the current mode, when a viewpoint converting button CB1 displayed as a command button on the screen of the display 21 is pressed, the synthetic high angle mode M24 is set as the current mode. Even if the synthetic high angle mode M24 is the current mode, when the viewpoint converting button CB1 displayed on the screen of the display 21 is pressed, the synthetic standard mode M23 is set as the current mode. If the synthetic high angle mode M24 is the current mode, when the converting switch 85 is pressed, the standard mode M21 is set as the current mode.

In the back mode M2, a display image corresponding to the current mode is generated by the image processing section 3 and displayed on the display 21. If the standard mode M21 and the wide mode M22 are the current mode, the display 21 displays a display image that only includes back images BP1 and BP2 obtained from capturing in the back camera 53. If the synthetic standard mode M23 is the current mode, the display 21 displays a display image that includes a synthetic image BP4 viewed from the virtual viewpoint VP and a back image BP5 obtained from capturing in the back camera 53 side by side. If the synthetic high angle mode M24 is the current mode, instead of the back image BP5 in the synthetic standard mode M23, a synthetic image BP6 viewed from the virtual viewpoint VP is displayed.

5-1. Standard Mode

Figure 17:
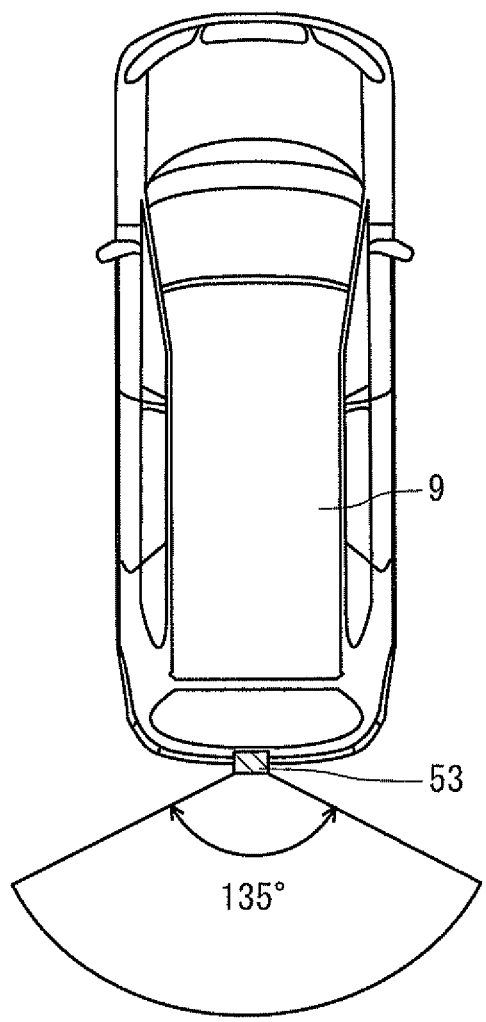
FIG. 17 is a view showing a horizontal angle of a visual field scope of a standard mode.

As illustrated in FIG. 16, in the standard mode M21, the display 21 only displays the back image BP1. The back image BP1 is not a synthetic image from the virtual viewpoint VP, but is a display image obtained in the manner that a captured image obtained from capturing in the back camera 53 is adjusted by the image adjusting section 31 to be a display image. As illustrated in FIG. 17, a horizontal angle of the visual field scope of the back image BP1 is 135°. In the standard mode M21, the rear region of the vehicle 9 is presented in a natural aspect.

In the back image BP1, a guide line GL presenting an expected path upon reversing of the vehicle 9 is displayed in an overlapping manner. The guide line GL is moved in accordance with a rotation direction and a rotation angle of the steering wheel input from the steering sensor 84. Accordingly, based on the guide line GL, the driver can reverse the vehicle 9.

5-2. Wide Mode

As illustrated in FIG. 16, even in the wide mode M22, the display 21 only displays the back image BP2. The back image BP2 is not a synthetic image from the virtual viewpoint VP, but is a display image obtained in the manner that a captured image obtained from capturing in the back camera 53 is adjusted in the image adjusting section 31 to be a display image. In the back image BP2 as well, the guide line GL indicating an expected path upon reversing of the vehicle 9 is displayed in an overlapping manner.

Figure 18:
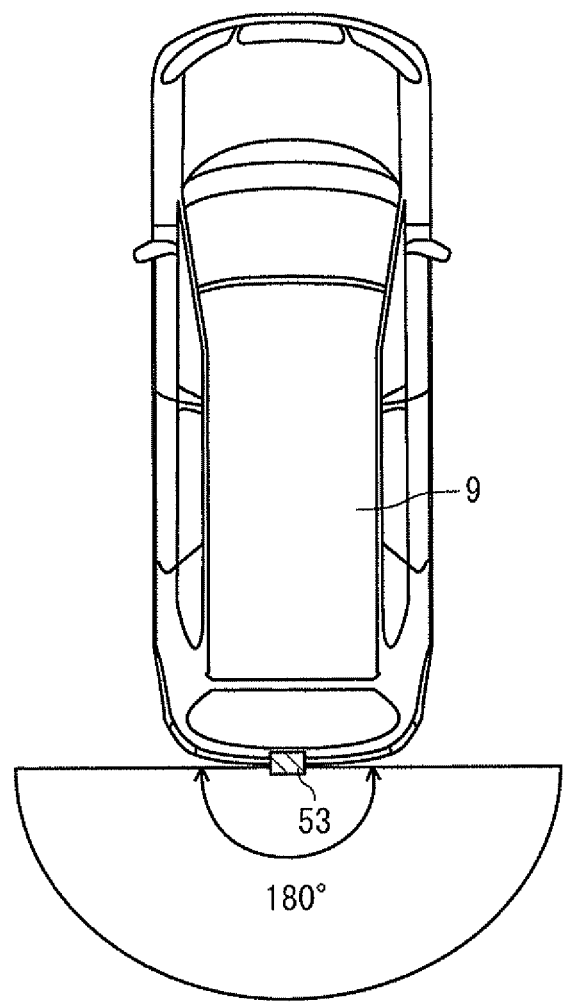
FIG. 18 is a view showing a horizontal angle of a visual field scope of a wide mode.

As illustrated in FIG. 18, a horizontal angle of the visual field scope of the back image BP2 is 180°. An object having a larger scope in the horizontal direction than the standard mode M21 can be monitored. Accordingly, in case of head-on parking, when the vehicle is reversed from the parking lot, the driver can monitor the left and right regions of the rear side that may be easily blinded, by using the wide mode M22 in the display aspect described above.

5-3. Synthetic Standard Mode

Figure 19:
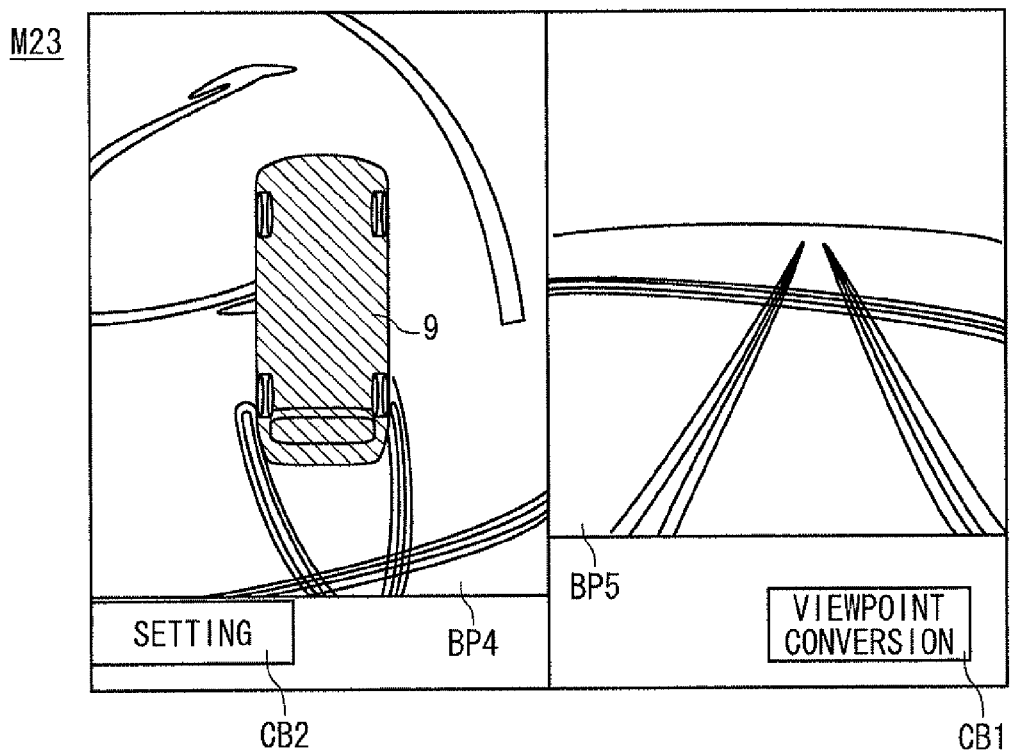
FIG. 19 is a view showing an example of a display image of a synthetic standard mode.

FIG. 19 is a view showing an example of a display image to be displayed on the display 21 in the synthetic mode M23. As illustrated in FIG. 19, on a display image in the synthetic standard mode M23, the synthetic image BP4 is disposed at the left side, and the back image BP5 is disposed at the right side. The synthetic image BP4 is a synthetic image viewed from the virtual viewpoint VP looking down the entire periphery of the vehicle 9. The back image BP5 is not a synthetic image from the virtual viewpoint VP, but is a display image obtained in the manner that a captured image obtained from capturing in the back camera 53 is adjusted in the image adjusting section 31 to be a display image. A horizontal angle of the visual field scope of the back image BP5 is 135°.

The driver sees the display image of the synthetic standard mode M23 in the display aspect described above, so that he/she can monitor the entire periphery of the vehicle 9 and the rear region of the vehicle 9 at the same time. Accordingly, the driver can safely reverse the vehicle 9 while recognizing an object around the entire circumference of the vehicle 9.

5-4. Synthetic High Angle Mode

Figure 20:
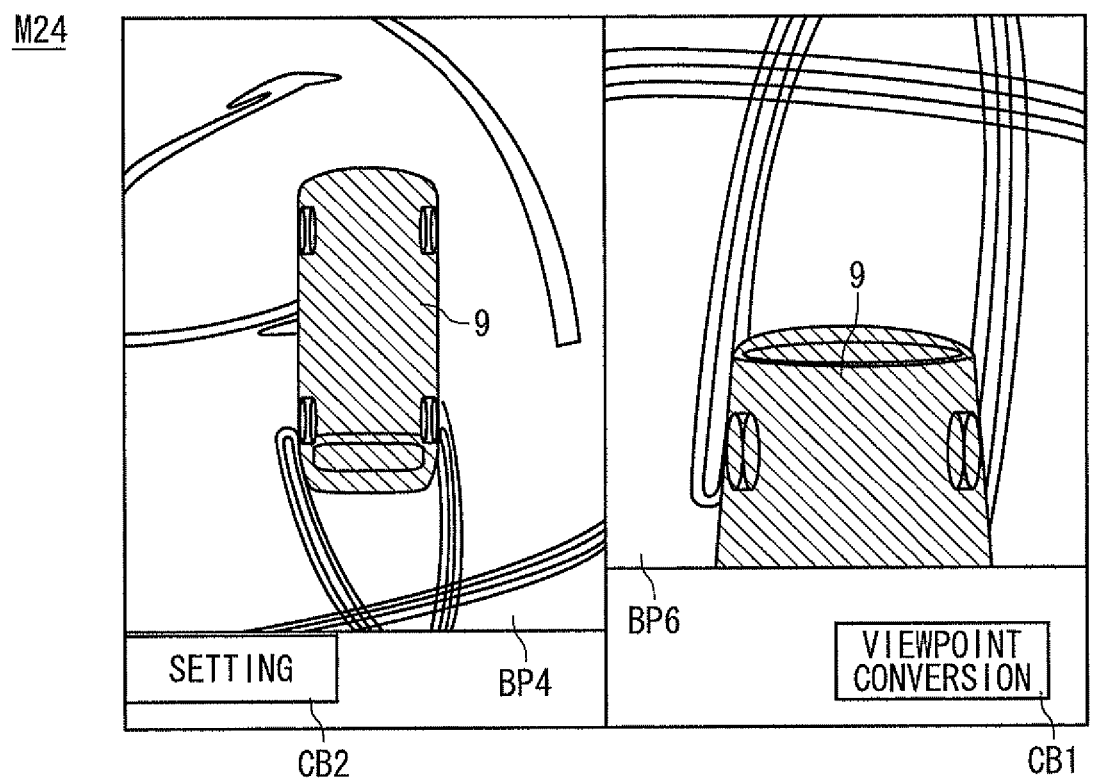
FIG. 20 is a view showing an example of a display image of a synthetic high angle mode.

FIG. 20 is a view showing an example of a display image to be displayed on the display 21 in the synthetic high angle mode M24. As illustrated in FIG. 20, the synthetic image BP4 viewed from the virtual viewpoint VP looking down the entire periphery of the vehicle 9 is disposed at the left side of the display image in the synthetic high angle mode M24, as in the synthetic standard mode M23. The synthetic image BP6 viewed from the virtual viewpoint VP substantially directly looking down the vicinity of the rear end of the vehicle 9 is disposed at the right side of the display image.

Figure 21:
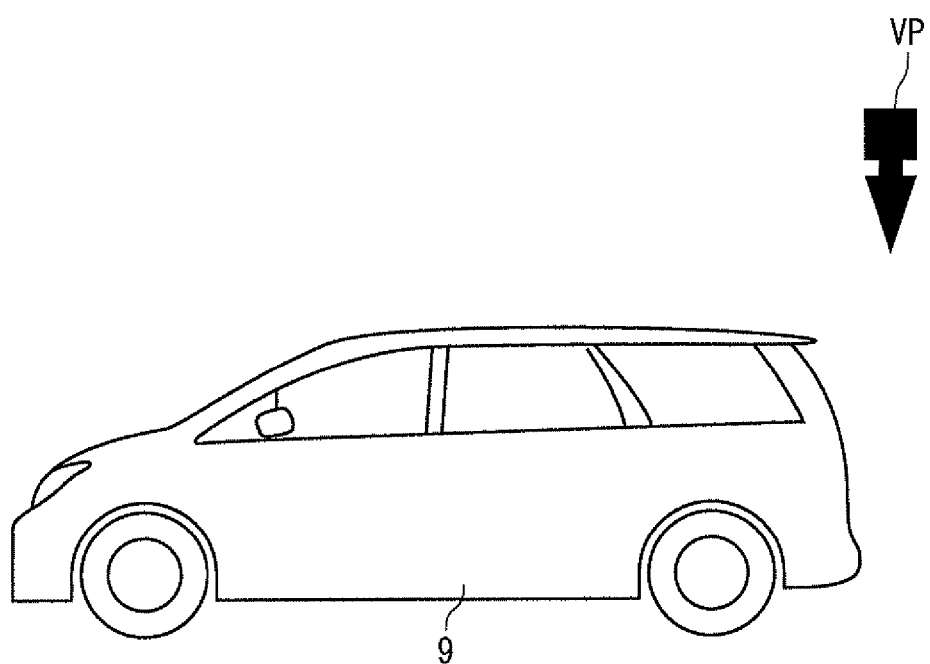
FIG. 21 is a view showing a viewpoint position of a virtual viewpoint of a synthetic high angle mode.

As illustrated in FIG. 21, the viewpoint position of the virtual viewpoint VP of the synthetic image BP6 is set to the position substantially directly above the rear end of the vehicle 9. The visual field direction is set to substantially a direct downward direction. Accordingly, on the synthetic image BP6, a region near the rear end of the vehicle 9 is enlarged and presented in the state that the region is looked down from the upward direction to substantially the direct downward direction. On the synthetic image BP6, a rear direction of the vehicle 9, which is the driving direction upon reversing of the vehicle 9, is an upper side direction of the image.

The driver sees the display image of the synthetic high angle mode M24 in the display aspect described above, so that he/she can easily monitor clearance between the vehicle 9 and an object around the vehicle 9, in particular, clearance with an object existing near the rear end of the vehicle 9. Meanwhile, it is difficult to monitor an object existing apart from the vehicle 9 in the rear region of the vehicle 9, which is the driving direction upon reversing of the vehicle 9. Accordingly, the synthetic high angle mode M24 is a display mode that can be effectively used under a special circumstance such as final adjustment of a parking position of the vehicle 9 in the case where the vehicle 9 is reversed upon parking.

5-5. Angle Adjustment

For the synthetic image BP4 disposed at the left side in the synthetic standard mode M23 (refer to FIG. 19) and the synthetic high angle mode M24 (refer to FIG. 20), the viewpoint position of the virtual viewpoint VP can be set to a position desired by the driver. In the synthetic standard mode M23 or the synthetic high angle mode 24, a setting button CB2 displayed as a command button on the screen is pressed, so that a setting screen to set the viewpoint position of the virtual viewpoint VP is displayed.

Figure 22:
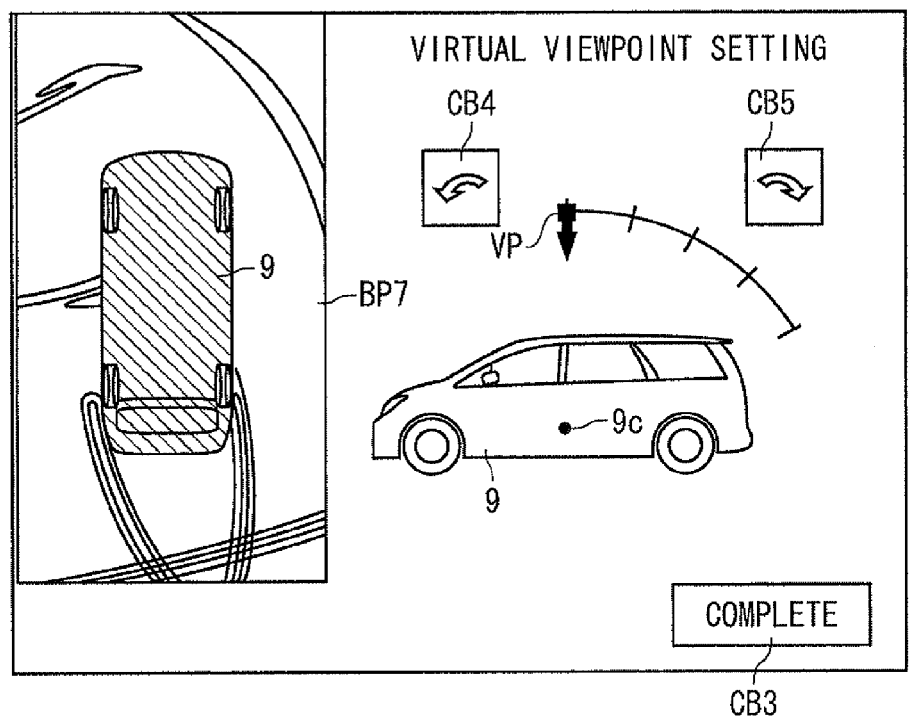
FIG. 22 is a view showing a setting screen of a virtual viewpoint.
Figure 23:
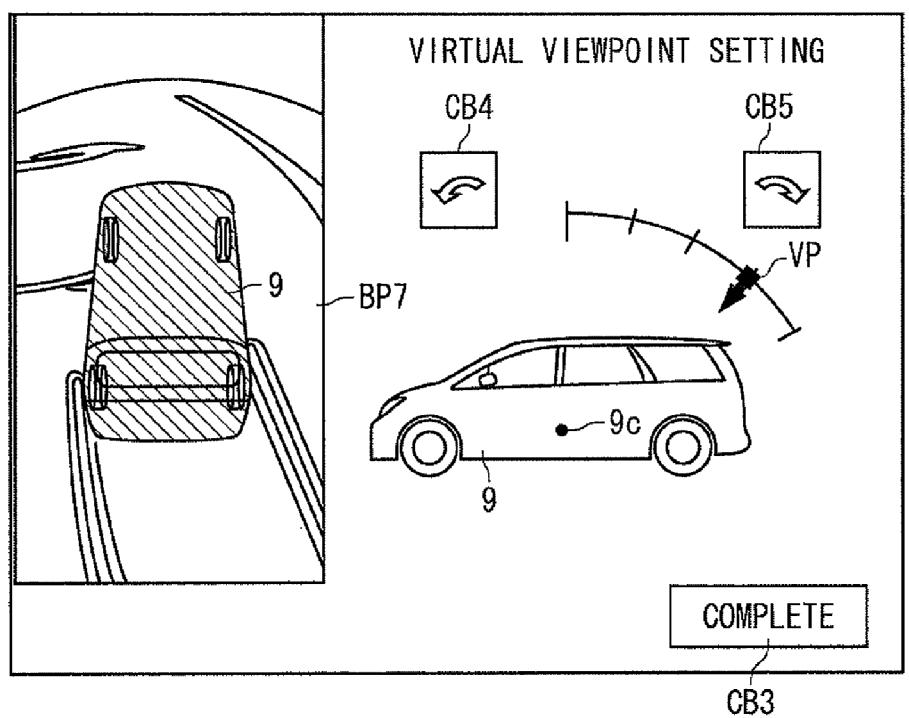
FIG. 23 is a view showing a setting screen of a virtual viewpoint.

FIGS. 22 and 23 are views showing the setting screen of the virtual viewpoint VP. The setting screen shows an indicator presenting the position of the virtual viewpoint VP to the vehicle 9, together with illustration of the side surface of the vehicle 9. The command buttons CB4 and CB5 on the screen are pressed so that the indicator can be moved. The position of the moved indicator to the illustration of the vehicle 9 is set as the viewpoint position of the virtual viewpoint VP. In this case, the visual field direction of the virtual viewpoint VP is set to be toward substantially a center 9c of the vehicle 9. FIG. 22 is a view showing an example of the case where the viewpoint position of the virtual viewpoint VP is set to a position directly above substantially a center of the vehicle 9. FIG. 23 is a view showing an example of the case where the viewpoint position of the virtual viewpoint VP is set to the rear position of the vehicle 9.

The left side of the setting screen displays the synthetic image BP7 in the case where the position of the indicator is the virtual viewpoint VP. Accordingly, by seeing the setting screen, it can be easily determined which synthetic image BP7 is obtained in the case where the virtual viewpoint VP is moved. Accordingly, the driver can move the virtual viewpoint VP to his/her desired position.

Figure 24:
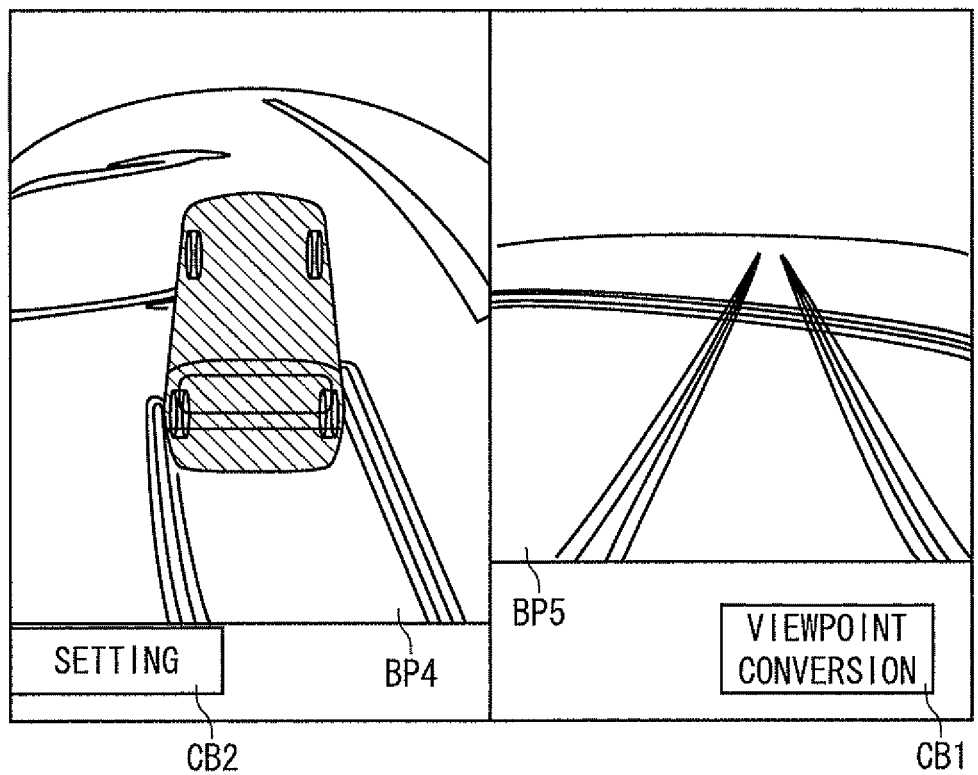
FIG. 24 is a view showing an example of a display image of a synthetic standard mode.

When the finish button CB displayed as a command button on the setting screen is pressed, the set contents are reflected on the display of the synthetic standard mode M23 and the synthetic high angle mode 24. For example, when the finish button BC3 on the setting screen as illustrated in FIG. 23 is pressed, the vehicle 9 is presented on the synthetic image BP4 at the left side of the display image in the state that the vehicle 9 is viewed from the rear side of the vehicle 9, as illustrated in FIG. 24. Since the viewpoint position of the virtual viewpoint VP can be set, the driver can recognize the positional relation between the vehicle 9 and an object around the vehicle 9 from a desired angle upon reversing of the vehicle 9.

5-6. Current Mode Setting

In the back mode M2, there are four display modes different from each other. An instruction from the driver by using the converting switch 85 or others is received. In accordance with the instruction, one display mode is set to the current mode. In general, the driver frequently uses one desired display mode among the four display modes in accordance with his/her favorites or an environment of a parking lot that he/she usually uses. If a display mode desired by the driver needs to be set as the current mode each time the vehicle 9 is reversed, the operation will become complicated.

Accordingly, the image display system 100 stores a display mode which has been recently set as the current mode in the back mode M2. When the operation mode becomes the back mode M2 next time, the control section 1 sets the display mode which has been recently set as the current mode, as the current mode immediately after the operation mode becomes the back mode M2. Accordingly, the driver does not need to perform the complicated operation to select his/her desired display mode each time the vehicle 9 is reversed.

Figure 25:
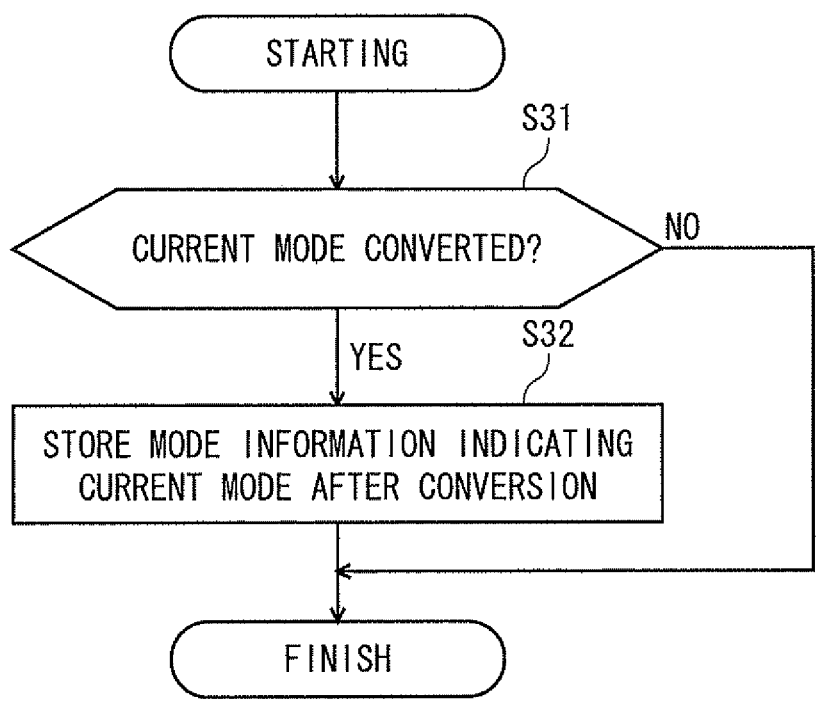
FIG. 25 is a view showing processing flow to store mode information.

FIG. 25 is a view showing flow of processing to store information indicating the current mode that has been most recently set. The processing is repeatedly carried out by the control section 1, in the case where the operation mode is the back mode M2.

First, it is determined whether or not the current mode has been converted into another display mode (S31). If the current mode has been converted into another display mode, mode information indicating the current mode after the conversion is stored in the non-volatile memory 11 (S32). Since the processing is carried out each time the current mode is converted, mode information indicating the display mode that has been recently set as the current mode is stored in the non-volatile memory 11. The mode information is stored in the non-volatile memory 11 when the operation mode is an operation mode other than the back mode M2 (when the transmission of the vehicle 9 is at a position other than "R (reversing)") or when the power of the image display system 100 is off.

Figure 26:
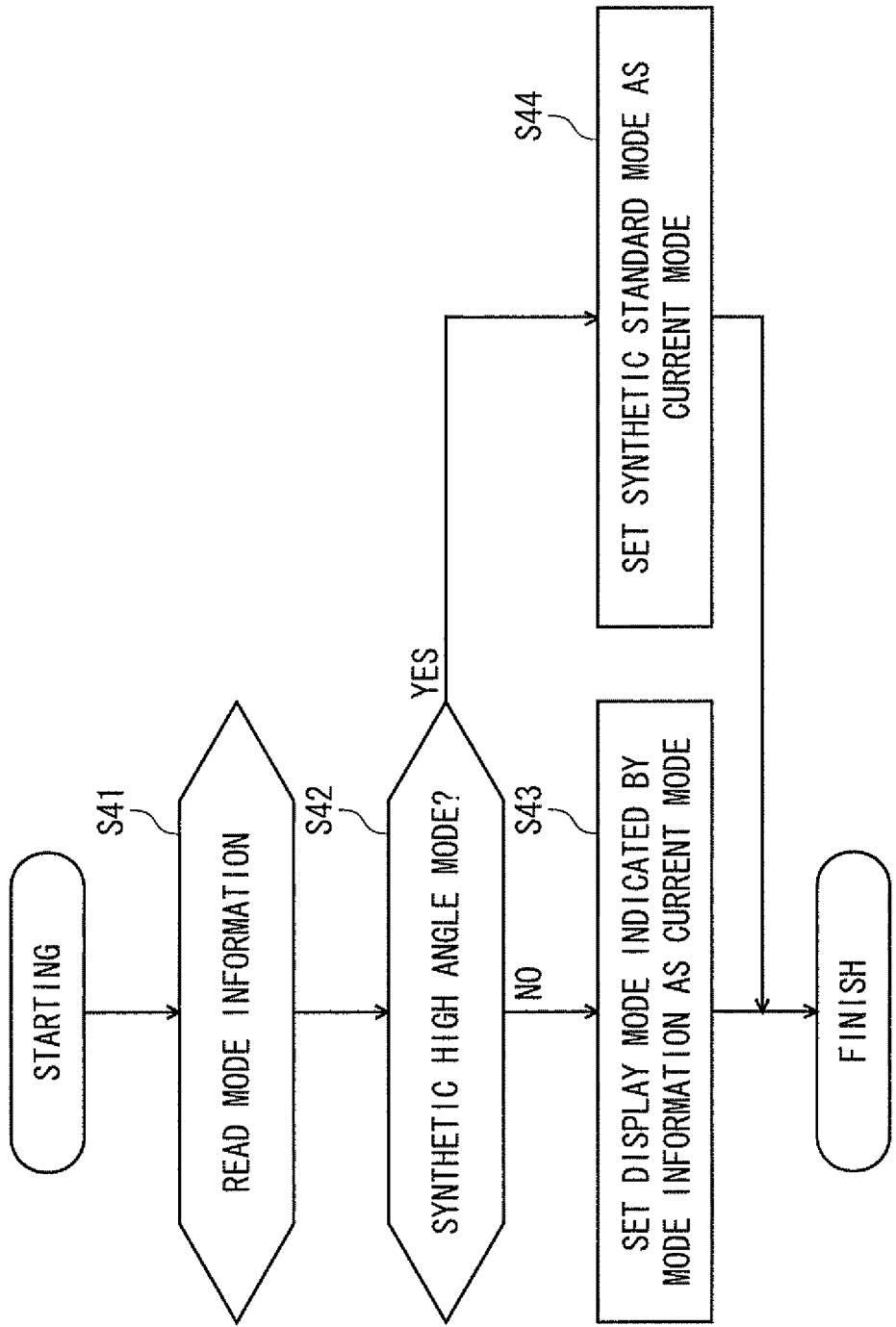
FIG. 26 is a view showing processing flow of time to start a back mode.

FIG. 26 is a view showing processing flow of time to start the back mode M2. The processing is carried out by the control section 1 when the transmission of the vehicle 9 is operated to be positioned at "R (reversing)," and when the operation mode is the back mode M2.

First, the mode information stored in the non-volatile memory 11 is read (S41). It is determined what is the display mode indicated by the read mode information (S42).

If the display mode indicated by the mode information is a display mode other than the synthetic high angle mode M24 (No in S42), the display mode indicated by the mode information is set as the current mode (S43). If the display mode indicated by the mode information is the synthetic high angle mode M24 (Yes in S42), the synthetic standard mode M23 is set as the current mode (S44).

The display mode that has been recently set as the current mode is in principle set as the current mode immediately after the operation mode becomes the back mode M2. However, if the display mode that has been recently set as the current mode is the synthetic high angle mode M24, the synthetic standard mode M23, and not the synthetic high angle mode M24, is set as the current mode immediately after the operation mode becomes the back mode M2. Since the synthetic high angle mode M24 is usually used when the parking position of the vehicle 9 is finally adjusted, the synthetic high angle mode M24 is rarely used at the time of starting reversing of the vehicle 9. Accordingly, if the display mode that has been recently set as the current mode is the synthetic high angle mode M24, on exception, another display mode is set as the current mode immediately after the operation mode becomes the back mode M2, so that the complicated operation to change the current mode from the synthetic high angle mode M24 to another display mode is unnecessary.

Meanwhile, the processing to exceptionally treat the synthetic high angle mode M24 may be carried out by a processing different from that illustrated in FIGS. 25 and 26.

Figure 27:
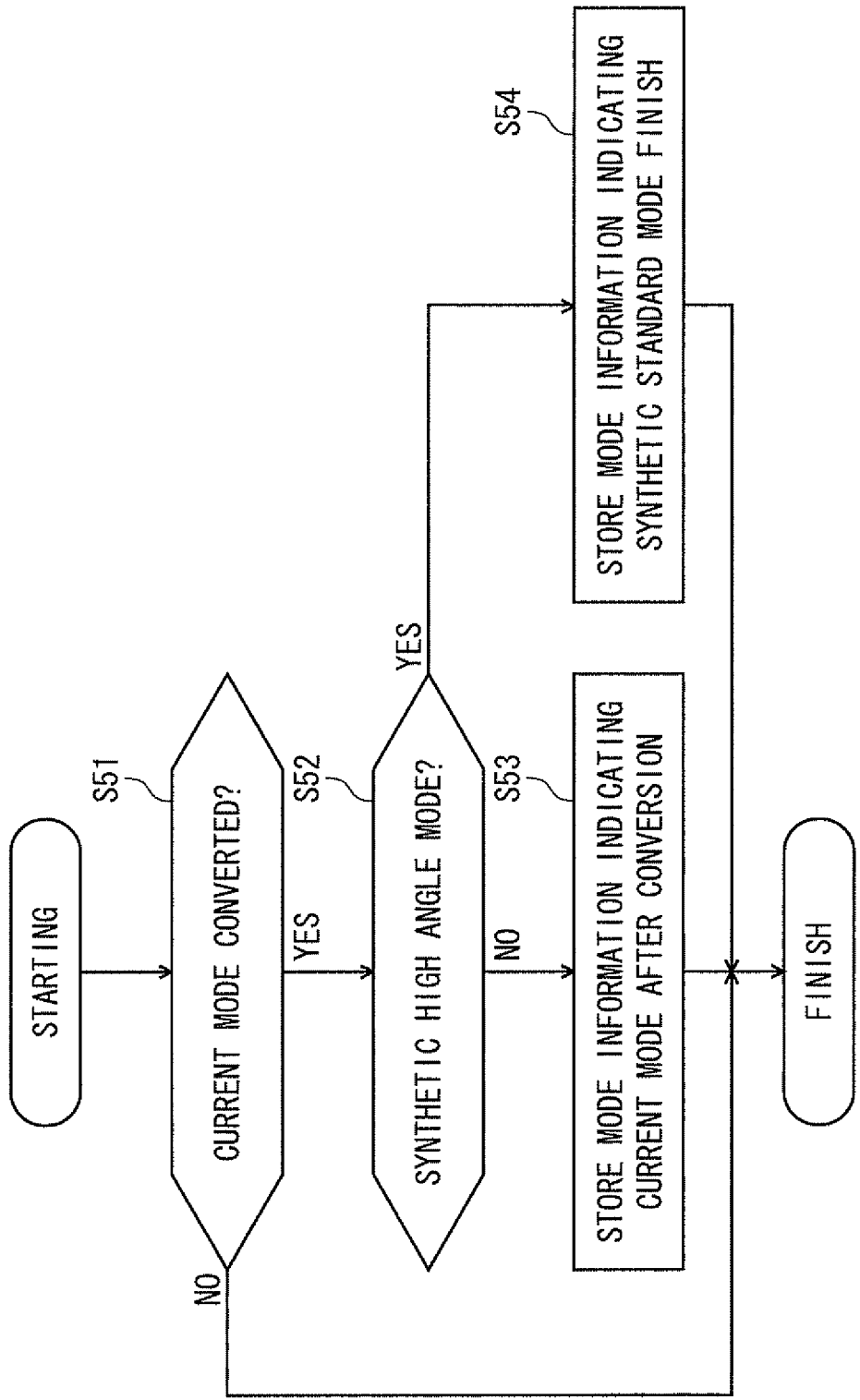
FIG. 27 is a view showing processing flow to store mode information.

FIG. 27 is a view showing another example of flow of processing to store information indicating the recent current mode. The processing also is repeatedly carried out by the control section 1 when the operation mode is the back mode M2.

First, it is determined whether or not the current mode has been converted into another display mode (S51). If the current mode has been converted into another display mode, it is determined what is the current mode after the conversion (S52).

If the current mode after the conversion is a display mode other than the synthetic high angle mode M24 (No in S52), mode information indicating the current mode after the conversion is stored in the non-volatile memory 11 (S53). If the current mode after the conversion is the synthetic high angle mode M24 (Yes S52), mode information indicating the synthetic standard mode M23 is stored in the non-volatile memory 11 (S54).

Accordingly, mode information indicating the display mode that has been recently set as the current mode is in principle stored in the non-volatile memory 11. However, if the current mode that has been recently set is the synthetic high angle mode M24, on exception, mode information indicating the synthetic standard mode M23 is stored.

Figure 28:
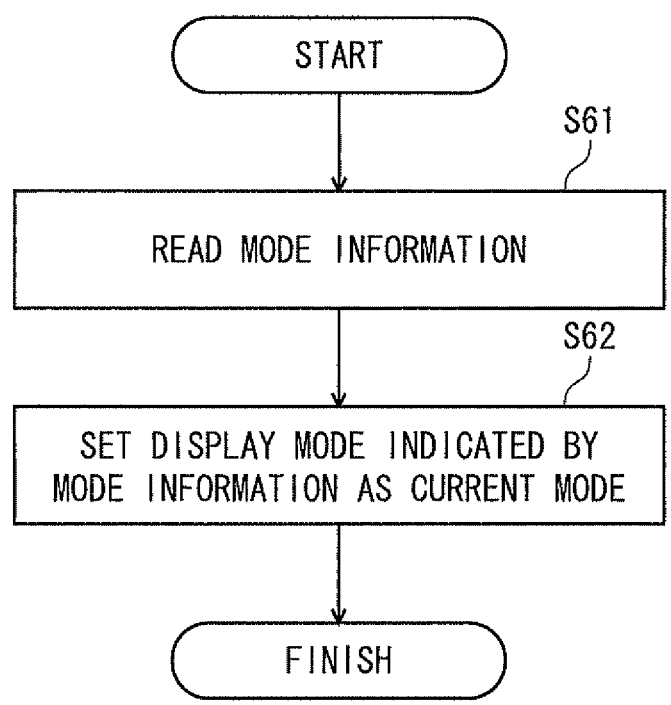
FIG. 28 is a view showing processing flow of time to start a back mode.

FIG. 28 is a view showing processing flow of time to start the back mode M2 in carrying out the processing of FIG. 27. The processing also is carried out by the control section 1 when the transmission of the vehicle 9 is operated to be positioned at "R (reversing)" such that the operation mode becomes the back mode M2.

First, mode information stored in the non-volatile memory 11 is read (S61). The display mode indicated by the read mode information is set as the current mode (S62).

In the processing as well, if the display mode that has been recently set as the current mode is the synthetic high angle mode M24, on exception, another display mode may be set as the current mode immediately after the operation mode becomes the back mode M2. As a result, the complicated operation to change the current mode from the synthetic high angle mode M24 to another display mode is unnecessary.

6. Modified Embodiment

An embodiment of the present invention has been described. However, the present invention is not limited to the embodiment that has been described. Various modifications to the present invention may be made. Hereinafter, modified embodiments of the present invention will be described. Of course, the modifications set forth below may be properly combined.

In the embodiment that has been described, the image generating apparatus 10 and the navigation apparatus 20 are different. However, the navigation apparatus 20 and the image generating apparatus 10 may be disposed in the same housing to construct an integrated apparatus.

In the embodiment that has been described, the display apparatus that displays a display image generated in the image generating apparatus 10 is the navigation apparatus 20. However, the display apparatus may be a general display apparatus that has not a special function such as a navigation function.

In the embodiment that has been described, part of the function that is realized by the control section 1 of the image generating apparatus 10 may be realized by the control section 23 of the navigation apparatus 20.

Signals from the shift sensor 81, the vehicle speed sensor 82, the direction instructing device 83, the steering sensor 84, and the converting switch 85 are input into the image generating apparatus 10. However, part or all of the signals may be input into the navigation apparatus 20. In that case, part or all of the signals may be input into the control section 1 of the image generating apparatus 10 through the communication section 42.

In the embodiment that has been described, an instruction of a direction desired by the driver is input from the direction instructing device 83. However, the instruction may be input by other means. For example, movement of a viewpoint of the driver is detected from an image obtained from capturing the driver's eyes. From the detection results, a direction instruction intended by the driver may be input.

In the embodiment that has been described, the specific display mode that is exceptionally treated in the back mode M2 is the synthetic high angle mode M24. However, another display mode, and not the synthetic high angle mode M24, may be set as the specific display mode. For example, a display mode that only displays an image from a virtual viewpoint substantially directly looking down the vicinity of the rear end of the vehicle 9 may be the specific display mode. Preferably, a display mode in an aspect used under a special condition such as final adjustment of a parking position is the specific display mode.

In the embodiment that has been described, various functions are accomplished by software through calculation processing of the CPU in accordance with programs. However, part of the functions may be accomplished by an electrical hardware circuit. Reversely, part of the function that is accomplished by a hardware circuit may be accomplished by software.

The present invention is based on Japanese patent applications filed on May 29, 2009 (Japanese Patent Application No. 2009-130100), the disclosures of which are herein incorporated by reference.

DESCRIPTION OF REFERENCE NUMERALS

1 control section
3 image processing section
5 capturing section
10 image generating apparatus
11 non-volatile memory
21 display
32 synthetic image generating section
42 communication section
100 image display system

The invention claimed is:

1. An image generating apparatus that generates an image to be displayed on a display apparatus mounted on a vehicle, the image generating apparatus comprising:
a synthetic image generating section that generates a synthetic image around the vehicle based on a plurality of images of the periphery of the vehicle taken by a plurality of cameras, the synthetic image being viewed from a virtual viewpoint which is disposed behind the vehicle and is directed to the front side of the vehicle;
an output section that outputs the generated synthetic image to the display apparatus; and
an input section that inputs a direction indication of a driver of the vehicle,
wherein the synthetic image generating section:
generates a first synthetic image in which left side area of the vehicle is displayed in substantially the same size as right side area of the vehicle when the direction indication is not input by the input section;
generates a second synthetic image in which the left side area of the vehicle is displayed larger in size than the right side area of the vehicle when the direction indication indicates a left direction; and
generates a third synthetic image in which the right side area of the vehicle is displayed larger in size than the left side area of the vehicle when the direction indication indicates a right direction.

2. The image generating apparatus as set forth in claim 1, wherein the synthetic image generating section continues to generate the second synthetic image for a predetermined period when the input section stops inputting the direction indication, and
wherein the synthetic image generating section starts generating the first synthetic image after the predetermined period when the direction indication is not input during the predetermined period.

3. The image generating apparatus as set forth in claim 1, further comprising a display image generating section that generates a display image including a front image taken by a camera provided at the front side of the vehicle and the synthetic image generated by the synthetic image generating section,
wherein the output section outputs the generated display image to the display apparatus.

4. The image generating apparatus as set forth in claim 1, wherein when changing the virtual viewpoint of the synthetic image from a first position to a second position, the synthetic image generating section moves the virtual viewpoint from the first position to the second position in a stepwise manner to generate a plurality of synthetic images for creating an animation in which the virtual viewpoint is moved in a continuous manner.

5. An image generating apparatus that generates an image to be displayed on a display apparatus mounted on a vehicle, the image generating apparatus comprising:
a synthetic image generating section that generates a synthetic image around the vehicle based on a plurality of images of the periphery of the vehicle taken by a plurality of cameras, the synthetic image being viewed from a virtual viewpoint which is disposed behind the vehicle and is directed to the front side of the vehicle, and including a right side area and a left side area of the vehicle;
a display image generating section that generates a display image including a front image taken by a camera provided at the front side of the vehicle and the synthetic image generated by the synthetic image generating section; and
an output section that outputs the generated display image to the display apparatus such that the front image and the synthetic image are displayed on the display apparatus simultaneously.

6. An image generating apparatus that generates an image to be displayed on a display apparatus mounted on a vehicle, the image generating apparatus comprising:
a synthetic image generating section that generates a synthetic image being viewed from a virtual viewpoint based on a plurality of images of the periphery of the vehicle taken by a plurality of cameras; and
an output section that outputs the generated synthetic image to the display apparatus, wherein when changing the virtual viewpoint of the synthetic image from a first position to a second position, the synthetic image generating section moves the virtual viewpoint from the first position to the second position in a stepwise manner to generate a plurality of synthetic images and continuously displaying the plurality of synthetic images while moving the virtual viewpoint in a continuous manner, thereby creating an animation.

7. The image generating apparatus as set forth in claim 6, wherein the synthetic image generating section changes the virtual viewpoint from a reference position.

8. The image generating apparatus as set forth in claim 7, wherein the reference position is a position corresponding to a viewpoint of a driver of the vehicle.

9. An image display system to be mounted on a vehicle, the image displaying system comprising:
   the image generating apparatus as set forth in claim 1; and
   a display apparatus that displays an image generated by the image generating apparatus.

10. An image display system to be mounted on a vehicle, the image displaying system comprising:
    the image generating apparatus as set forth in claim 5; and
    a display apparatus that displays an image generated by the image generating apparatus.

11. An image display system to be mounted on a vehicle, the image displaying system comprising:
    the image generating apparatus as set forth in claim 6; and
    a display apparatus that displays an image generated by the image generating apparatus.

* * * * *